United States Patent [19]

Bryant et al.

[11] 4,047,000
[45] Sept. 6, 1977

[54] CONTROL SYSTEM FOR COMPUTER CONTROLLED IDENTIFICATION OF BOTTLES

[75] Inventors: Nelson H. Bryant, Ithaca; Ross L. Hobler, Elmira, both of N.Y.; Wilbur J. Allen, Millerton, Pa.; Joseph W. Poliseo, Elmira, N.Y.

[73] Assignee: Powers Manufacturing, Inc., Elmira, N.Y.

[21] Appl. No.: 636,875

[22] Filed: Dec. 2, 1975

[51] Int. Cl.² .......................................... G01D 21/04
[52] U.S. Cl. .................................. 235/151.1; 209/72; 250/223 B
[58] Field of Search ........... 235/151.1, 151.3, 61.11 E; 250/223 B, 216, 568; 209/72, 73, 74 M; 356/240; 65/29, 158; 340/172.5; 444/1

[56] References Cited

U.S. PATENT DOCUMENTS

| | | | |
|---|---|---|---|
| 3,601,616 | 8/1971 | Katsumata | 250/223 B |
| 3,662,181 | 5/1972 | Hercher et al. | 250/223 B X |
| 3,687,559 | 8/1972 | Fischer | 356/240 |
| 3,745,314 | 7/1973 | Mathias et al. | 235/61.11 E |
| 3,963,918 | 6/1976 | Jensen et al. | 250/223 B |

*Primary Examiner*—Edward J. Wise
*Attorney, Agent, or Firm*—Seidel, Gonda & Goldhammer

[57] ABSTRACT

The mold source of a bottle provided with one or more sectors spanning a circumferential zone with prism-like timing marks thereon is identified by an on-line programmed microcomputer. The bottle is identified by a laser beam and sensor. The sensor generates a series of digital pulses in response to the passage of the laser beam through the timing marks. The leading and trailing edges of the pulses are time stamped by the microcomputer. A microcomputer program identifies the mold source of the bottle based on the time stamped information. The identification of the bottle and its status are stored in the microcomputer memory. A running log of the numbers of defective and acceptable bottles produced by the mold source is printed out based on the contents of the microcomputer memory.

10 Claims, 14 Drawing Figures

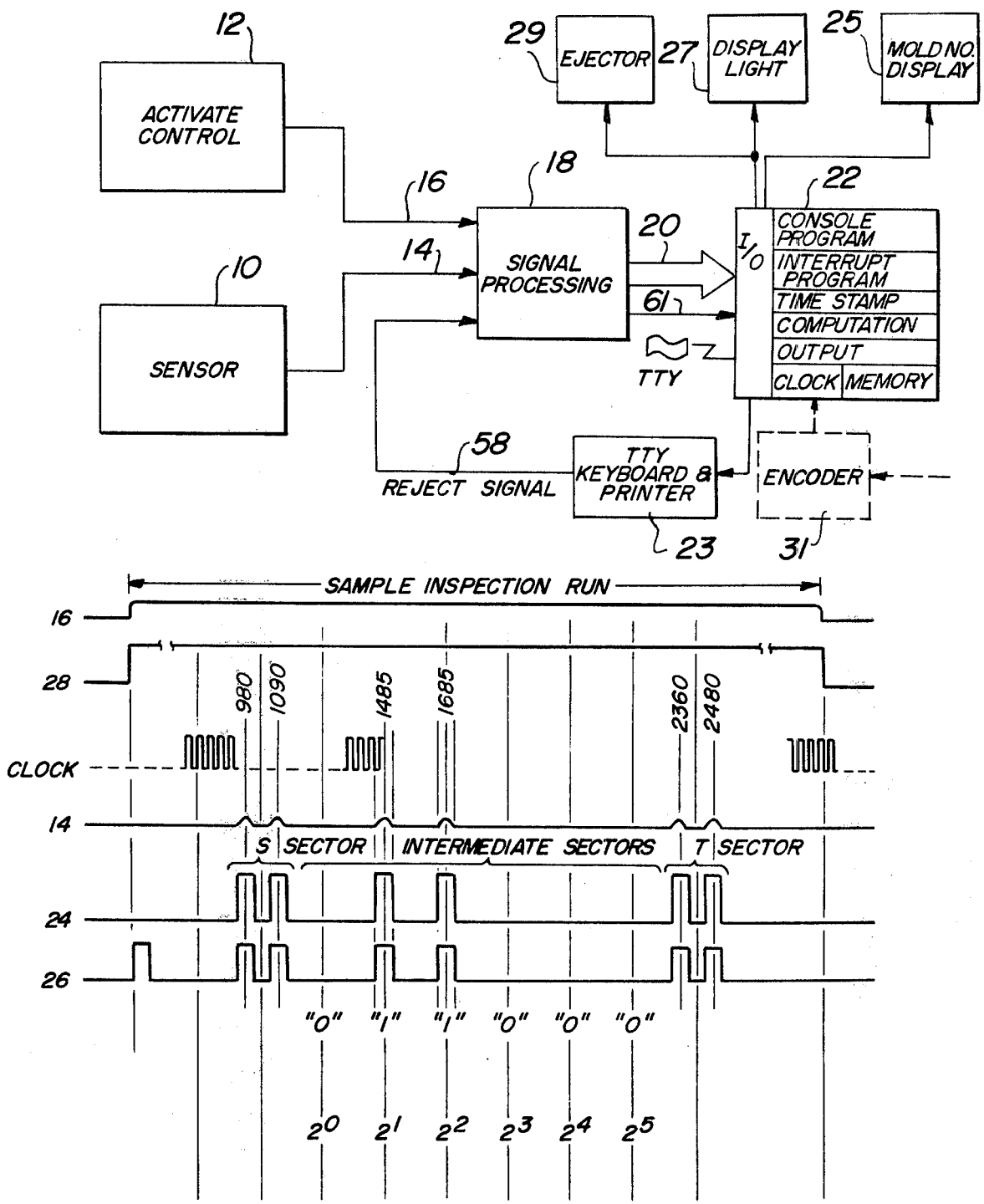

CONSOLE PROGRAM

INTERRUPT PROGRAM

INTERRUPT TIME STAMP PROGRAM

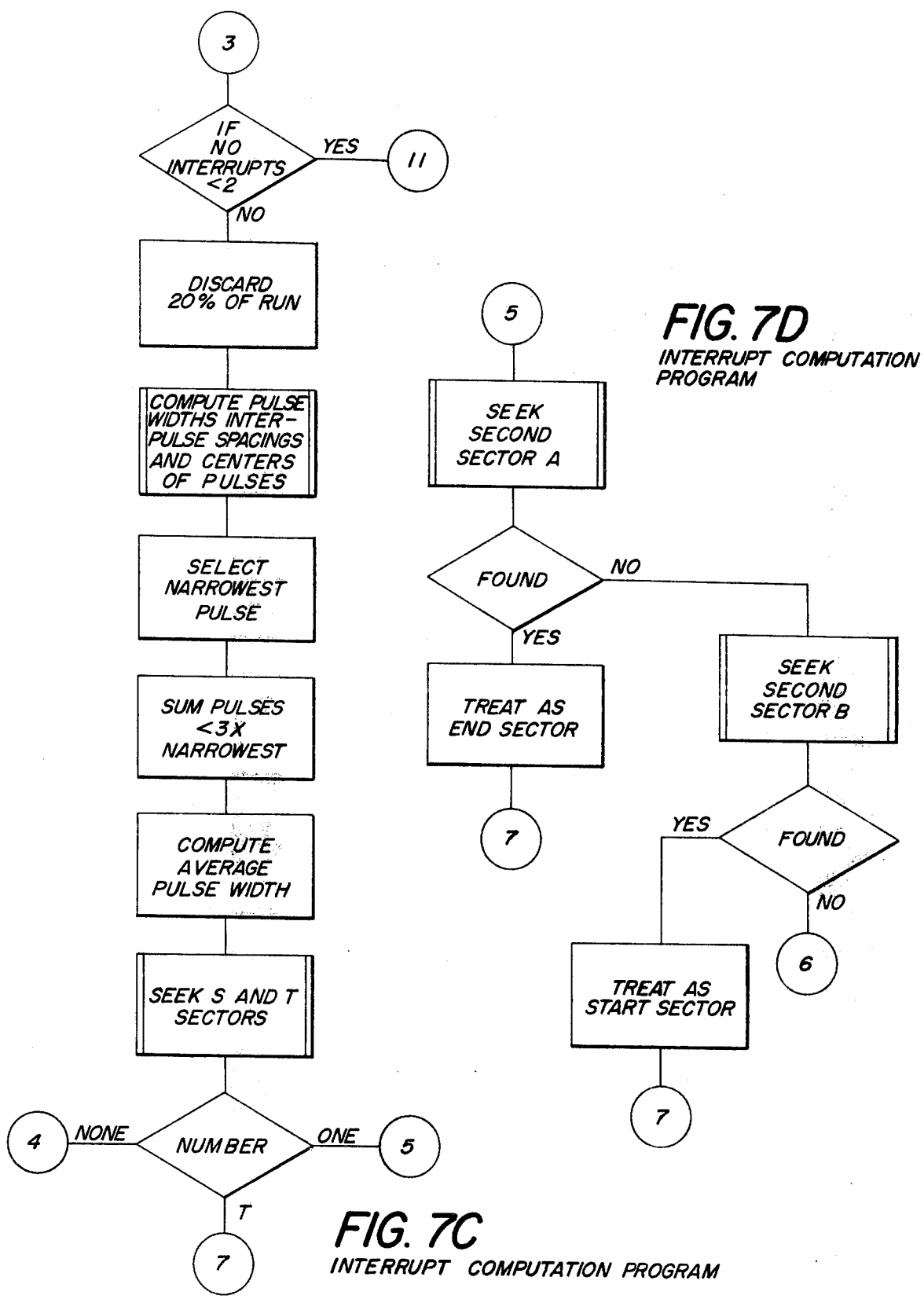
FIG. 7C INTERRUPT COMPUTATION PROGRAM
FIG. 7D INTERRUPT COMPUTATION PROGRAM

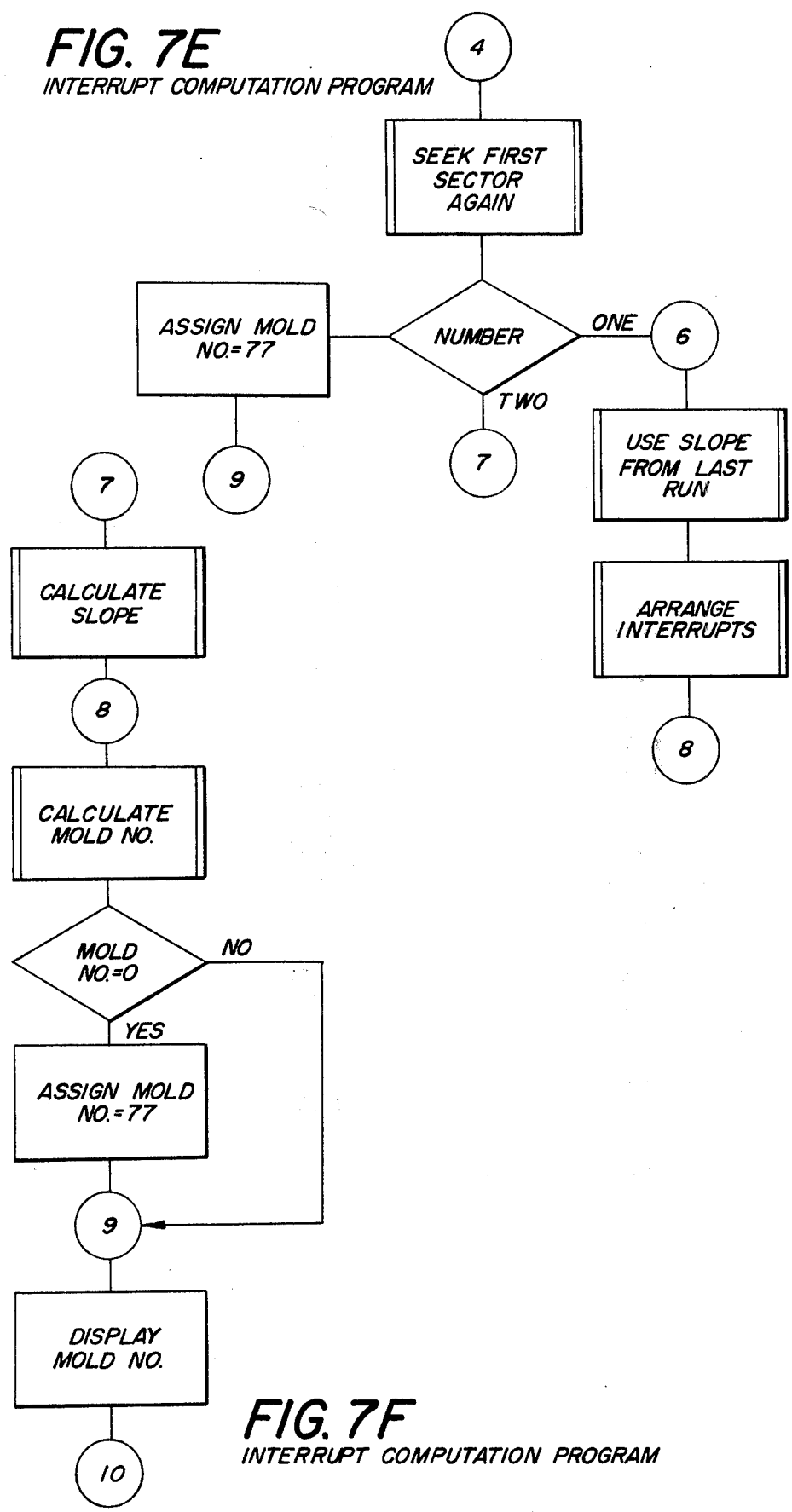
FIG. 7E INTERRUPT COMPUTATION PROGRAM
FIG. 7F INTERRUPT COMPUTATION PROGRAM

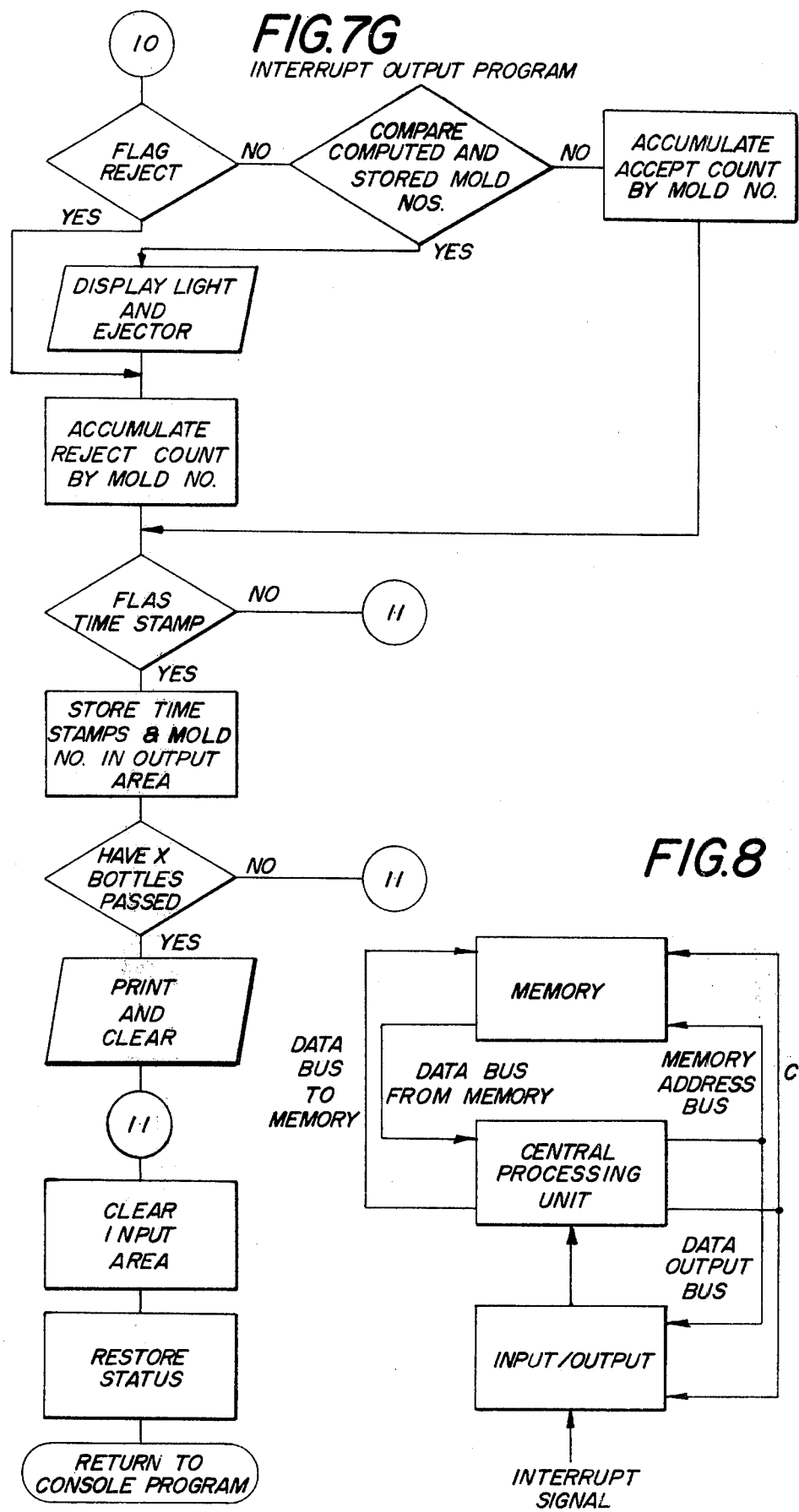

CONTROL SYSTEM FOR COMPUTER CONTROLLED IDENTIFICATION OF BOTTLES

BACKGROUND OF THE INVENTION

The present invention relates to a system for automatically identifying the mold source of a bottle and providing a running history of the identity and status of an entire procession of bottles.

It is known in the art to automatically identify the contents or source of production of a container by a variety of surface markings placed on the exterior thereof. For example, nonreflective stripes may be placed on the exterior of a metal can to connote the contents of the can, as described in U.S. Pat. No. 2,647,799. A plurality of optical source-detector pairs is used to identify the markings on the can to provide an indication of its contents. Also, it is known to inspect a transparent bottle by forming projections on the bottom of the bottle as described in U.S. Pat. No. 3,301,396. The projections are counted by a plurality of mechanical sensing arms. The total number of projections identifies the mold source of the bottle.

Such identification systems are unduly time-consuming and require a multiplicity of inspection equipment. The disadvantages of such systems are discussed in greater detail in application Ser. No. 467,702 entitled "Method And Apparatus For Identifying A Bottle" filed May 6, 1974 assigned to the assignee herein and incorporated herein by reference. In application Ser. No. 467,702, there is described a method and apparatus for identifying a transparent bottle provided with one or more sectors spanning a circumferential zone with prism-like timing marks thereon using a laser beam and sensor. The sensor generates a series of digital pulses in response to the passage of the laser beam through the timing marks. The inspection technique is simple, fast and reliable and requires a minimal amount of inspection equipment. Only a single inspection station is required to identify each bottle in an entire procession. The mold source of the bottle is rapidly identified by a hard-wired electronic control circuit described in the application. The circuit automatically computes the mold number of a bottle and compares the couputed mold number with predetermined mold numbers corresponding to molds known to be producing defective bottles. The circuit activates an ejector mechanism for ejecting the bottle under inspection when the computed mold number matches any of the stored mold numbers.

A hard-wired control system is relatively expensive and inflexible compared to a programmable computer control system for the same purpose, see Callin and Baskin, Microcompressor System Design, Digital Design (February 1975), Hernandez, Mini/Micro I/O Interfaces, Digital Design (April 1975), and Davidoro, Microcomputers—What They Mean to Your Company, Intel Application Note (1975). Thus, the number of logical functions which can be performed by the hard-wired circuit is inherently limited whereas the programmable computer control system offers increased system capability. For example, in the hard-wired circuit disclosed in application Ser. No. 467,702, the computed mold number for each bottle cannot be stored for later use. As a result, it is not possible to provide a history of the identity and status of more than one inspected bottle at a time. Stated otherwise, the information output and control capacity of the hard-wired circuit is relatively limited. Moreover, any modification to a programmable computer control can be effected simply and quickly by modifying existing programs whereas modification of hard-wired systems is more cumbersome and slow.

BRIEF SUMMARY OF THE INVENTION

Briefly, the present invention is directed to a computer controlled system for identifying a bottle provided with one or more sectors spanning a circumferential zone with prism-like timing marks thereon based on the passage of a laser beam through each of the sectors and the generation of a series of digital pulses by a sensor in response thereto, including generating a series of digital clock pulses; time stamping the leading and trailing edges of the sensor pulses with the clock pulses and storing the time stamp information; digitally computing the pulse widths and inter-pulse spacings of the sensor pulses in terms of the time stamp information; digitally comparing the spans of the sectors in terms of the time stamp information with the inter-pulse spacings of the sensor pulses; and digitally weighting the sensor pulses to identify the mold source of the bottle based on the comparison of the spans of the sectors with the inter-pulse spacings of the sensor pulses.

A primary advantage of the present invention is its versatility in providing a large number of logic functions with reduced hardware requirements by the use of software programs.

Another advantage of the present invention is its compactness and reliability.

A further advantage of the present invention is the provision of a running log of the identity and status of each bottle in an entire procession of bottles.

A still further advantage of the present invention is the collection and storage of data for a plurality of bottle inspections and the analysis and collation thereof for immediate use by the operator.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 2 is a block diagram of the present invention.

FIG. 3 is a diagram of certain waveforms generated in the present invention for the distribution of timing marks shown in FIG. 1.

FIG. 7C–7F is a flow diagram of the Computation portion of the program in the present invention.

FIG. 7G is a flow diagram of the Output portion of the program in the present invention.

FIG. 8 is a schematic diagram of the general architecture of the microcomputer system shown in FIG. 2.

DETAILED DESCRIPTION OF THE INVENTION

Figure 1:
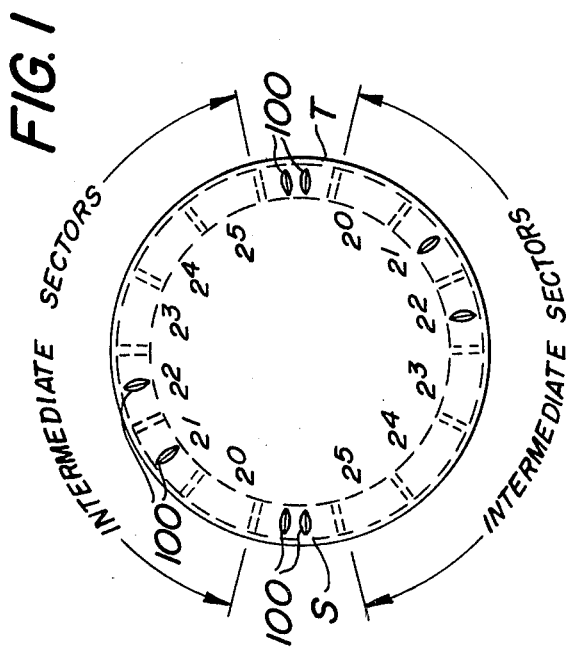
FIG. 1 is a bottom view of the bottom of a bottle having one or more sectors spanning a circumferential zone with prism-like timing marks thereon.

Referring to the drawings, wherein like numerals indicate like elements, there is shown in FIG. 1 the bottom of a bottle provided with sectors spanning a circumferential zone thereof. The bottle is transported through an inspection area by a linear conveyor (not shown) as described in U.S. Pat. No. 3,557,950 for "Photo-Electric Crack Detector For Glass Bottles" assigned to the assignee herein and incorporated herein by reference. There are fourteen sectors of uniform widths positioned about a circumferential zone of the bottom of the bottle, see FIG. 1. The sectors are provided with prism-like timing marks 100 which project outwardly from the bottom of the bottle. The timing marks are prism-shaped to bend a laser beam directed at the circumferential zone toward a sensor 10, shown in block form in FIG. 2, as described in detail in application Ser. No. 467,702 entitled "Method And Apparatus For Identifying A Bottle" assigned to the assignee herein. The S and T sectors are provided with two or more closely spaced timing marks whereas each of the sectors located between the S and T sectors, hereinafter the "intermediate sectors," are provided with no timing marks or at most one timing mark. The timing marks 100 are distributed in the intermediate sectors symmetrically with respect to a diameter connecting and S and T sectors. Thus, in traversing the circumferential zone from either the S to the T sector or the T to the S sector, the same sequence of timing marks and blank sectors is observed.

The distribution of the timing marks 100 in the intermediate sectors in the circumferential zone as shown in FIG. 1 represents a digital binary number which is equivalent to the decimal number of the mold which produced the bottle. The absence of the timing mark in an intermediate sector connotes a binary 0 while the presence of a timing mark in a sector connotes a binary 1. By changing the distribution of the timing marks in the intermediate sectors, a multiplicity of binary numbers may be defined as explained in greater detail in application Ser. No. 467,702.

The sensor 10, FIG. 2, is located in proximity to the bottle as it is being conveyed to the inspection area so that a laser beam bent by a timing mark will be incident on the sensor whereas a laser beam passing through a sector without a timing mark will miss the sensor. A particular configuration of the laser, bottle and sensor is discussed in detail in application Ser. No. 467,702.

In response to the passage of the laser beam through a timing mark 100, sensor 10 generates a digital pulse, indicating a binary 1. Sensor 10 generates no signal when the laser beam passes through an intermediate sector having no timing mark therein, indicating a binary 0. Each intermediate sector is weighted according to a binary code so that the sequence in which the laser beam is detected by sensor 10 determines a binary number which may be decoded into its decimal equivalent as will be described in greater detail herein below.

Referring to FIG. 2, the system disclosed herein includes an activate control 12 and a signal processing circuit 18, each of which are hard-wired. The activate control 12 comprises one or more cams and relays for providing an indication that the bottle is being rotated in the inspection area, that is, that an inspection run is beginning or ending. The activate control 12 is described in greater detail in U.S. Pat. No. 3,557,950. The signals generated by activate control 12 and sensor 10 are processed by signal processing circuit 18. Signal processing circuit 18 provides the input signals which are operated on by programmed microcomputer 22 which is the heart of the system. In the preferred embodiment herein microcomputer 22 is an Intel MCS-80 microcomputer system using an Intel 8080 microprocessor or central processing unit for performing the arithmetic and control operations described hereinafter. The micro-processor includes typical computer components such as an instruction register, program counter, flag flip-flops and an arithmetic logic circuit. The microcomputer 22, includes, in addition to the microprocessor, an input/output section such as the Intel 8212 8-bit input/output port, a memory such as the Intel 8100 series random access memory, a master clock for synchronizing the computer operations such as the Intel 8224 clock generator and driver, and a PL/M software compiler for programming the microcomputer. The composition of the microcomputer is well-known and is described in the literature. For example, a detailed description may be found in the "Intel 8080 Microcomputer Systems Manual" (January 1975). A preferred architecture is generally shown in FIG. 8. Other arrangements will be obvious to a person of ordinary skill in the microcomputer art, given the disclosure herein.

The program for operating the microcomputer 22 may be inputted to the microcomputer by a standard model ASR 33 teletype (TTY) and punched tape, FIG. 2. Alternatively, the program may be stored in a read only memory portion of the microcomputer such as the Intel 8300 series MOS read only memory. The program includes a main portion, hereinafter the "Console program," and an externally activated portion, hereinafter the "Interrupt program." The Console program controls the operation of microcomputer 22 in conjunction with the teletype (TTY) keyboard and printer 23, FIG. 2. Thus, information can be inputted to the input/output section of the microcomputer by means of the teletype keyboard and information stored in the microcomputer can be printed out by the teletype.

Referring to FIGS. 2 and 3, the clock is free-running and emits a high frequency train of clock pulses which are used to time stamp or locate the leading and trailing edges of the signal processing circuit output 20 for use by the microcomputer as will be described in further detail herein below. The signal processing circuit output 20 consists of three digital signals: Data signal 24, Interrupt signal 26 and Activate signal 28, see FIG. 4. The data signal 24 is generated in response to the output of sensor 10. The clock pulses, hereinafter "time stamps" for the Data signal 24 are shown in FIG. 3 for a sample run using a bottle having the distribution of timing marks 100 shown in FIG. 1. The time stamps correspond to the numbers of the clock pulses generated internally by the clock in microcomputer 22. Based on the time stamps for the leading and trailing edges of the pulses in signal 24, the center lines of the pulses are computed to coincide with the clock pulses numbered 980, 1090, 1485, 1685, 2360 and 2480. The S and T sectors are located by comparing the inter-pulse spacings of the pulses in signal 24. Thus, the timing marks 100 in the S and T sectors, FIG. 1, are closely spaced as compared to the distance between timing marks in consecutive intermediate sectors. For the sample run recorded in FIG. 3, the center lines of the pulses in signal 24 due to the timing marks in the S and T sectors are 110 (1090-980) and 120 (2480-2360) clock pulses apart whereas the center lines of consecutive pulses due to the timing marks in the intermediate sectors are 200 (1685-1485) clock pulses apart. The S and T sector pulses, therefore, can always be located by comparing their inter-pulse spacings, in terms of the time stamps, to the inter-pulse spacing of consecutive pulses from the intermediate sectors. The particular sequence of computations performed in discriminating between S and T sector pulses and the intermediate sector pulses is described more fully herein below with respect to the computer program disclosed in flow diagram form in FIGS. 6 and 7A-7G.

Figure 6:
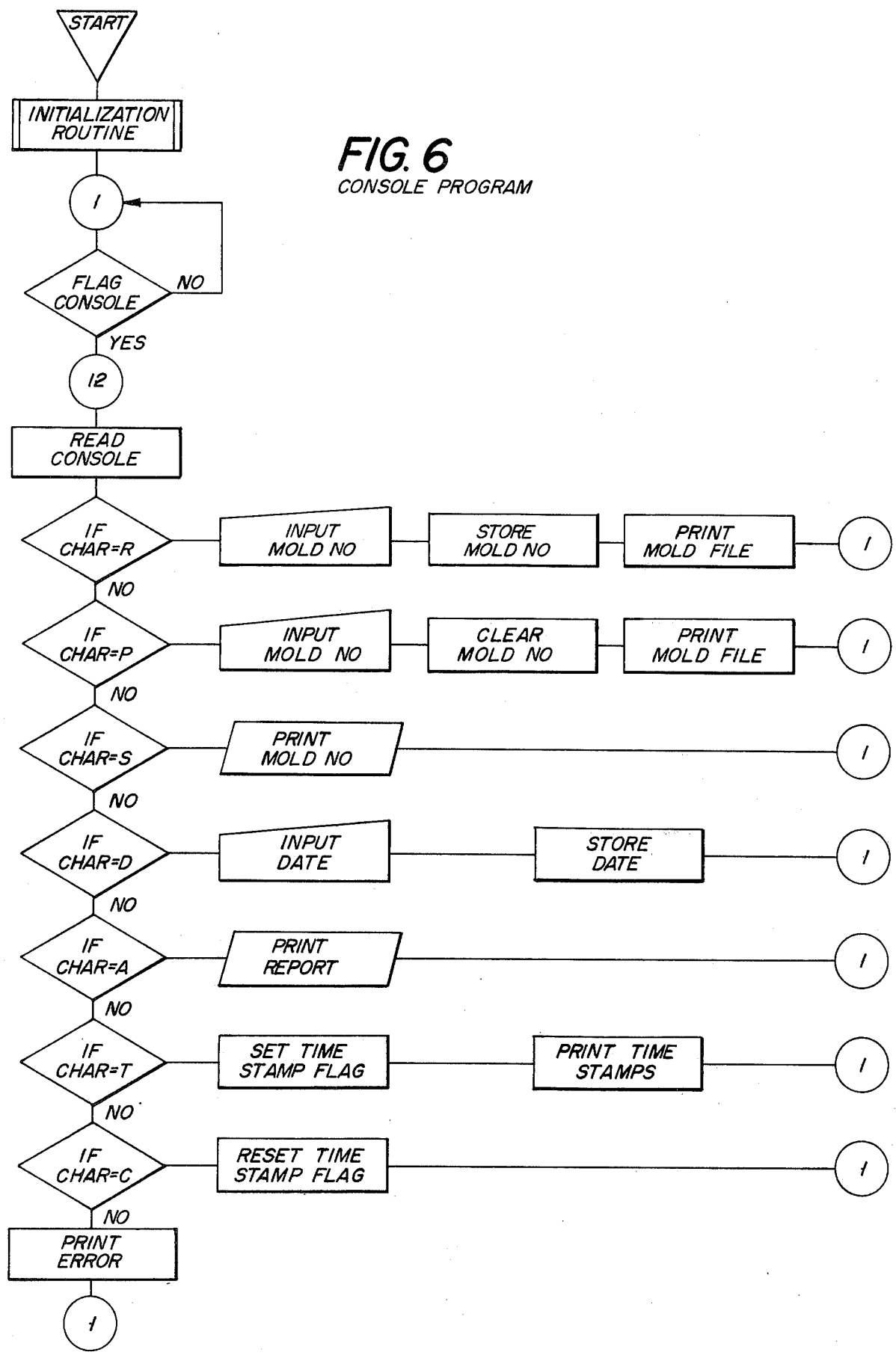
FIG. 6 is a flow diagram of the Console program in the present invention.

Referring to FIG. 6, the main or Console program is entered through START terminal when power is initially applied to the system. Control passes immediately to the INITIALIZATION routine wherein the random access memories are confirmed as empty and information located in a paper tape or read only memory, such as the Interrupt program described hereinafter, is transferred to the appropriate locations in the random access memories. The INITIALIZATION routine is not per se the subject of the invention and would be obvious to effect by one of ordinary skill in the microcomputer art given the disclosure herein.

Control is transferred from the INITIALIZATION routine through Junction 1 to the FLAG CONSOLE step in which a Flag Console flip-flop in the central processor unit is inspected to determine whether information is available from keyboard 23 of a standard ASR-33 teletype terminal (TTY) connected to the input/output section of the system, see FIG. 2. The Flag Console flip-flop is set by the keyboard operator by depressing a key on keyboard 23. If the Flag Console flip-flop has not been set, then the program returns to Junction 1 and the flip-flop is again inspected. Once information is available at the keyboard, the Flag Console flip-flop is set and control passes through Junction 12 to the READ CONSOLE step.

In the READ CONSOLE step, the microcomputer input/output ports connected to the keyboard are inspected to determine the nature of the command inputted at the keyboard. Control first passes to the IF CHAR=R branching step. In the preferred embodiment, if the keyboard character R has been depressed, control passes to the INPUT MOLD NO. terminal wherein the keyboard operator manually inputs the numbers of the molds which are known to be producing defective bottles. Control then passes to the STORE MOLD NO. step wherein the collection of mold numbers previously inputted through the keyboard and stored in the microcomputer memory is updated by the current input. The program then enters the PRINT MOLD FILE terminal which causes the teletype printer 23 to print out the updated file of stored mold numbers. Control is then transferred to Junction 1, the Flag Console flip-flop is again inserted, and the above steps are repeated.

If the keyboard character R has not been depressed, control passes to the IF CHAR=P branching step. If the character P has been depressed, control passes to the INPUT MOLD NO. terminal wherein the numbers of molds which in the past produced defective bottles but which are now producing acceptable bottles is inputted through the keyboard to the microcomputer input/output section. The program then enters the CLEAR MOLD NO. step in which the inputted mold numbers are erased from the microcomputer memory. Control then passes to the PRINT MOLD FILE terminal which causes the teletype printer 23 to print the updated file of mold numbers. The program then returns to Junction 1.

If neither keyboard character R nor P has been depressed, the program enters the IF CHAR=S branching terminal. If character S has been depressed, control passes directly to the PRINT MOLD FILE step and the file of mold numbers in the microcomputer memory is printed without any updating. The program then returns to Junction 1.

If keyboard characters R, P and S have not been depressed, control passes to the IF CHAR=D branching step. If character D has been depressed, the program enters the INPUT DATE terminal wherein the current date is inputted by the keyboard operator to the microcomputer input/output section. This date is printed out on all reports printed by teletype printer 23. Control then passes to the STORE DATE step wherein the inputted date is stored in the microcomputer memory. The program then returns to Junction 1.

If keyboard characters R, P, S and D have not been depressed, the program enters branching step IF CHAR=A. If character A has been depressed, the program enters the PRINT REPORT terminal wherein all information stored in the microcomputer memory which relates to the quantity of bottles rejected and mold numbers of those bottles is printed out by the teletype. In particular, the report will include both the quantities of bottles rejected and accepted, the quantity of bottles rejected as a result of the file of mold numbers in the microcomputer memory, the quantity of bottles rejected as a result of on-line detection as will be explained more fully hereinafter in connection with the Interrupt program, and the number of bottles which were inspected but for which no mold numbers could be identified. The program then returns to Junction 1.

If keyboard characters R, P, S, D and A have not been depressed, control passes to the IF CHAR=T branching step. If character T has been depressed, the program enters the SET TIME STAMP FLAG terminal wherein the Time Stamp Flag flip-flop in the central processor unit is set. The Time Stamp Flag flip-flop is used for diagnostic purposes as will be seen in the description of the Interrupt program following. Control then passes to the PRINT TIME STAMPS terminal which causes the keyboard to print all time stamps at which signals 20, FIG. 2, have been received by the central processor unit. The function of the time stamps will be described more fully hereinafter in connection with the Interrupt program. The program then returns to Junction 1.

If keyboard character R, P, S, D, A and T have not been depressed, control passes to the IF CHAR=C branching step. If keyboard character C has been depressed, the program enters the RESET TIME STAMP FLAG step wherein the Time Stamp Flag flip-flop is reset. The program then returns to Junction 1.

If the Flag Console flip-flop has been set but none of the above keyboard characters are depressed, the program enters the PRINT ERROR step in which the keyboard is caused to print an error indication, such as the word "Error," to indicate that the Flag Console flip-flop had been set to indicate that information was available at the keyboard but that an invalid key had in fact been depressed.

At any time during execution of the Console program, Interrupt signal 26 may be received at the microcomputer input/output section. The Interrupt signal 26 is generated at the beginning of an inspection run and at specific intervals therein by the circuit shown in FIG. 4. Sensor 10 and activate control 12 provide signals 14 and 16 to the input of signal processing circuit 18. Signal processing circuit 18 processes signals 14 and 16 and provies external data to microcomputer 22 in the form of signals 20. The microcomputer enters the Interrupt program in response to the signals 20 as will be described in detail hereinbelow.

The activate control 12 generates signal 16 in response to the rotation of a main shaft which drives the bottle detecting mechanism described in U.S. Pat. No. 3,557,950. Activate control 12 includes a sensor-arming cam fixed on the main shaft, a microswitch and a relay, such as the combination described in U.S. Pat. No. 3,557,950 at column 3, lines 16–26. The activate control output 16 indicates that an inspection run is beginning.

Figure 5:
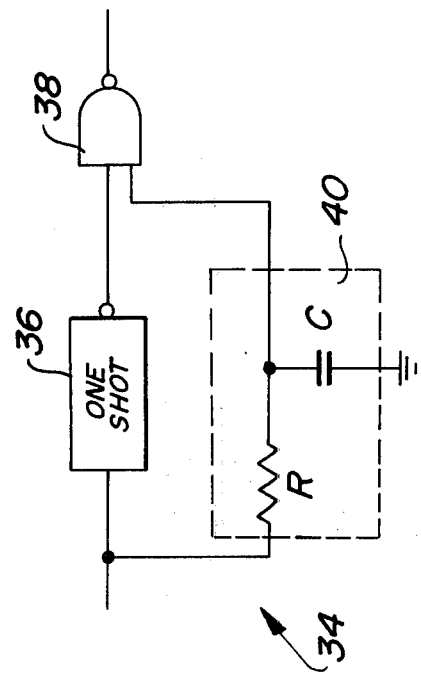
FIG. 5 is an electrical schematic of the noise immunity circuit shown in FIG. 4.

Sensor 10 generates signal 14 in response to the rotation of the bottle under inspection as described in application Ser. No. 467,702. For the distribution of timing marks 100 on the bottle bottom shown in FIG. 1, the signal 14 will take the form of a series of pulses as shown in FIG. 3. These pulses are shaped by a conventional pulse shaping circuit 30. The output of the pulse shaping circuit is fed to optical isolator 32 and then to noise immunity circuit 34. Optical isolator 32 may be any optical isolator circuit known in the art suitable for providing the appropriate voltage levels for operation of the digital circuitry in signal processing circuit 18. For example, optical isolator 32 may be a Monsanto MCT-2 isolator circuit. Noise immunity circuit 34 is shown in greater detail in FIG. 5. The circuit includes a one-shot circuit 36 and NAND gate 38. One-shot circuit 36 may be a positive-edge triggered one-shot such as a Texas Instruments 74123. The output of the one-shot is taken off its complementary output terminal and is fed to NAND gate 38. The input of one-shot circuit 36 is fed through the RC circuit 40 to the second input of NAND gate 38. The noise immunity circuit 34 cuts off the rising edge of the input signal to one shot circuit 36 and produces an inverted pulse of slightly shorter duration at the output of NAND gate 38. RC circuit 40 ensures that the NAND gate 38 is insensitive to noise pulses which may trigger one-shot circuit 36.

The output of noise immunity circuit 34 is fed to NAND gate 42 which, along with one-shot circuit 44, supplies the Interrupt signal 26. The output is also fed to driver circuit 46 which may be any suitable transistor driver circuit known in the art. Driver circuit 46 supplies the Data signal 24.

The signal 16 is generated by activate control 12 will take the form shown in FIG. 3. The signal is fed to optical isolator circuit 48 and noise immunity circuit 50, which are identical to circuits 32 and 34, respectively. The output of noise immunity circuit 50 is fed to one-shot circuit 52 which may be a negative-edge triggered one-shot such as a Texas Instruments 74123. The output of the one shot is taken off its complementary output terminal and is fed to NAND gate 42. The output of NAND gate 42, therefore, will include a pulse corresponding to the leading edge of signal 16 and a series of pulses corresponding to signal 14 pulses. This output is fed to one shot circuit 54 which may be a positive-edge triggered one shot such as a Texas Instruments 74123. The complementary output of the one shot is the Interrupt signal 26.

The output of noise immunity circuit 50 is also fed to driver circuit 56 which is identical to driver circuit 46. Driver circuit 56 supplies the Active signal 28.

In view of the above, it is seen that the microcomputer 22 will receive information as to the signal 14 generated by sensor 10 by means of Data signal 24; it will receive information as to the signal 16 generated by activate control 12 by means of Activate signal 28; and it will receive information as to the sequence in which the Activate signal 28 and Data signal 24 are generated by means of Interrupt signal 26.

Figure 7A:
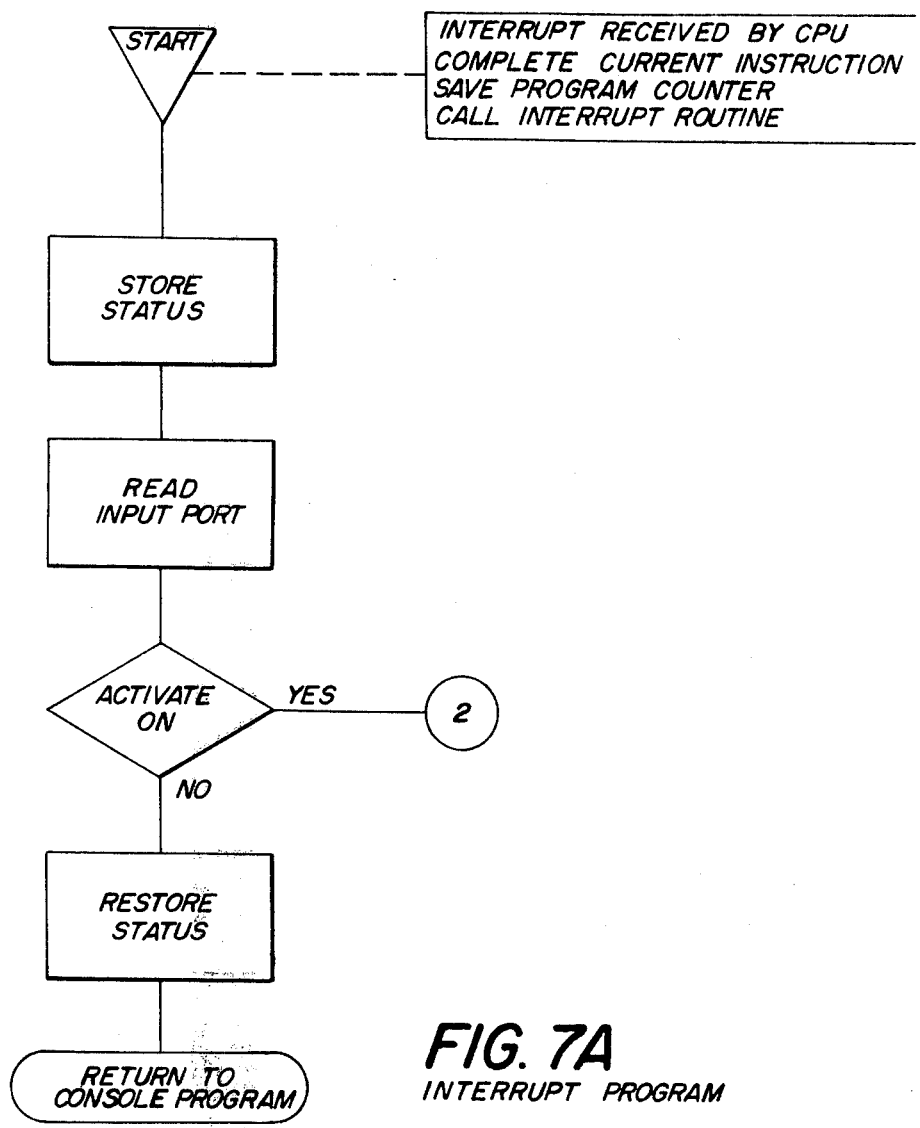
FIG. 7A is a flow diagram of the initial portion of the Interrupt program in the present invention.

Referring to the flow diagram for the Interrupt program, see FIG. 7A, the system enters the START terminal of the Interrupt program when an Interrupt signal 26 is generated at the input/output section of the microcomputer 22. The particular Console program instruction being executed by the computer when the Interrupt signal is generated is completed and the program counter in the central processing unit is saved at the next instruction. Additionally, a call is made for the Interrupt program. In the preferred embodiment herein, the Interrupt program is stored at a predetermined location in the microcomputer memory. Alternatively, the Interrupt program may be stored in a time shared computer memory associated with teletype 23 or it may be stored in a paper tape or other storate medium. These operations are indicated generally by the START terminal in the Interrupt program, FIG. 7 A.

The program then enters the STORE STATUS step wherein the central processor unit registers are saved at the Console program instruction just completed. Thus, if the Console program had been interrupted during the PRINT MOLD FILE step, FIG. 6, the status of the registers would be saved in the microcomputer memory so that execution may be re-started at this step.

Control is then passed to the READ INPUT PORT step wherein the input port to the input/output section at which the Activate signal appears, hereinafter the "Activate input" is inspected. The program then enters the ACTIVATE ON branching step. If no signal is present at the Activate input, this indicates that the Interrupt signal was due to noise for the output of sensor 10 while the system was not ready for an inspection run. Accordingly, the program enters the RESTORE STATUS terminal wherein the central processor unit registers are returned to their status at the last Console program instruction. Control then passes to the RETURN TO CONSOLE step wherein the system returns to the next Console program instruction to be executed.

If a signal is present at the Activate input, this indicates that the Interrupt signal 26 was valid, that is, that an inspection run is taking place. Accordingly, the program enters Junction 2, FIGS. 7A and 7B. Control then passes to the FLAG ACTIVATE step, FIG. 7B, wherein the Activate Flag flip-flop in the central processor unit is inspected. As will be described hereinafter, the Activate Flag flip-flop is set after the INITIALIZATION routine in Branch I is entered. If the flip-flop is set, the program branches to Branch II and control passes to the DATA ON terminal wherein the microcomputer inspects the input port to the input/output section at which the Data signal 24 appears, hereinafter the "data input."

If Data signal 24 is not present at the Data input, this indicates that the sensor is malfunctioning or that no bottle is present during the inspection run. Accordingly, the program jumps to the RESTORE STATUS step which restores the central processor unit registers to their status in the Console program as saved in the microcomputer memory. The system then returns to the next instruction in the Console program. The system will return to the Interrupt program upon receiving a new Interrupt signal at the input/output section. If, however, a signal is present at the Data input the program enters the NO. OF DATA SIGNALS = 24 branching step. In the preferred embodiment, the maximum number of timing marks 100 on the bottom of the bottle is 16. Thus, there can be two timing marks in each of the S and T sectors and one timing mark in each of the twelve intermediate sectors, see FIG. 1. Assuming that a bottle is rotated 1½ times during the inspection run, the maximum number of Data signals per inspection run is therefore 24. For each Data signal pulse generated during the inspection run, a pulse will appear at the input port to the input/output section to which the Interrupt signal 26 is fed, hereinafter the "Interrupt input," since the Activate signal 28 is on throughout the run, see FIG. 3. Accordingly, a count of the number of Interrupt signal pulses in a run, following the DATA ON step, is identical to a count of the number of Data signal pulses during the same run. The numbers of Interrupt signal pulses received at the input/output section is counted by the Interrupt counter in the central processing unit.

If the bottle has not yet been rotated 1½ times, the number of Data signal pulses will be less than 24. Accordingly, the program will branch to the INCREMENT INTERRUPT COUNTER BY ONE step. For the first Interrupt signal pulse (corresponding to the first Data signal pulse) the Interrupt counter is incremented from zero to one, for the second Interrupt signal pulse the counter is incremented from one to two, and so forth.

Control then passes to the TIME STAMP DATA SIGNAL LEADING EDGE terminal wherein the clock count at the leading edge of Data signal pulse is stored in the microcomputer memory. The program then enters the READ INPUT PORT step wherein the Data input is inspected to determine whether the Data signal pulse is still present. Control then passes to the DATA ON branching step. If the Data signal pulse is still present, the program enters a loop inspecting the Data input until the DATA ON step determines that the Data signal pulse has ended. The program then enters the TIME STAMP DATA SIGNAL TRAILING EDGE terminal wherein the clock count at the trailing edge of the Data signal pulse is stored in the microcomputer memory.

The system then enters the RESTORE STATUS step and returns to the Activate Loop, Branch I. The system repeats the operations described upon the occurrence of another Interrupt signal during the inspection run.

If the Activate Flag flip-flop has been set but no Data signal is present at the Data input or if the maximum number (for example, 24) of Data signl pulses has been received (indicating that all useful data has been collected), the program skips to the RESTORE STATUS step and then returns to the Activate Loop, Branch I. The next Interrupt signal takes the system back into Branch II wherein the Data input will again be inspected.

The program will not enter Branch II if the Activate Flag flip-flop is not set. After the Activate signal first goes on, the Activate Flat flip-flop remains reset, in its condition immediately after the end of the preceding run, and the system enters an INITIALIZATION routine in which the Interrupt counter in the central processing unit and the Mold Number Display 25, FIG. 2, will be cleared and the Activate Flag flip-flop set. Thereafter, the system enters the TIME STAMP ACTIVATE SIGNAL LEADING EDGE step in Branch I. In the TIME STAMP ACTIVATE SIGNAL LEADING EDGE step, the clock count at the leading edge of the Activate signal is stored in the microcomputer memory. The program then enters the READ INPUT PORT step wherein the Activate input is inspected for the Activate signal. Control then passes to the ACTIVATE ON branching step. If the Activate signal is still present at the input/output section, the system enters a loop in which the READ INPUT PORT and ACTIVATE ON steps are repeated until the next Interrupt signal is received or the Activate signal ends.

Figure 7B:
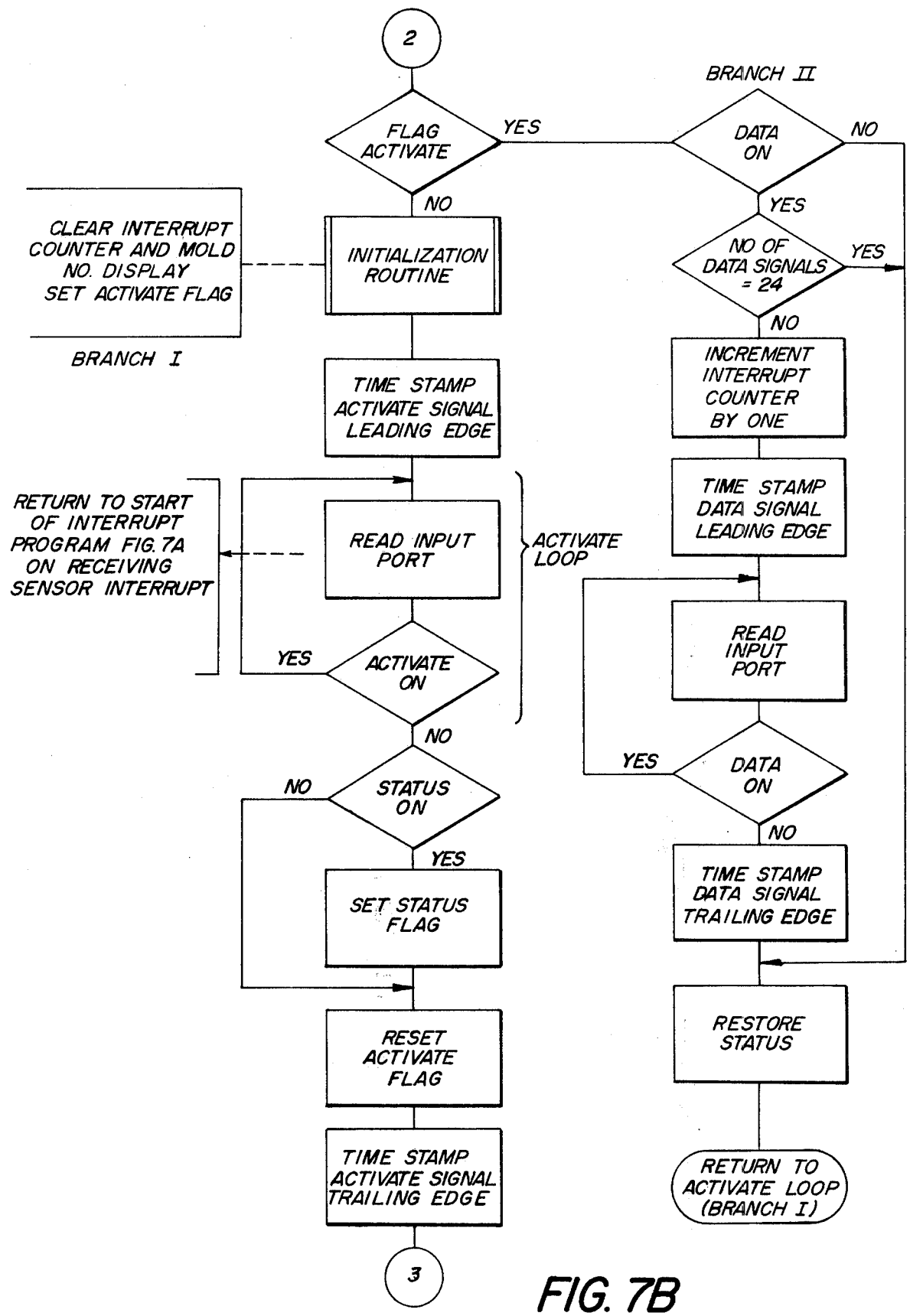
FIG. 7B is a flow diagram of the Time Stamp portion of the program in the present invention.

When the next Interrupt signal is received, the system leaves the Activate Loop and returns to the START terminal of the Interrupt program, see FIG. 7A, and enters Branch II of FIG. 7B.

Figure 4:
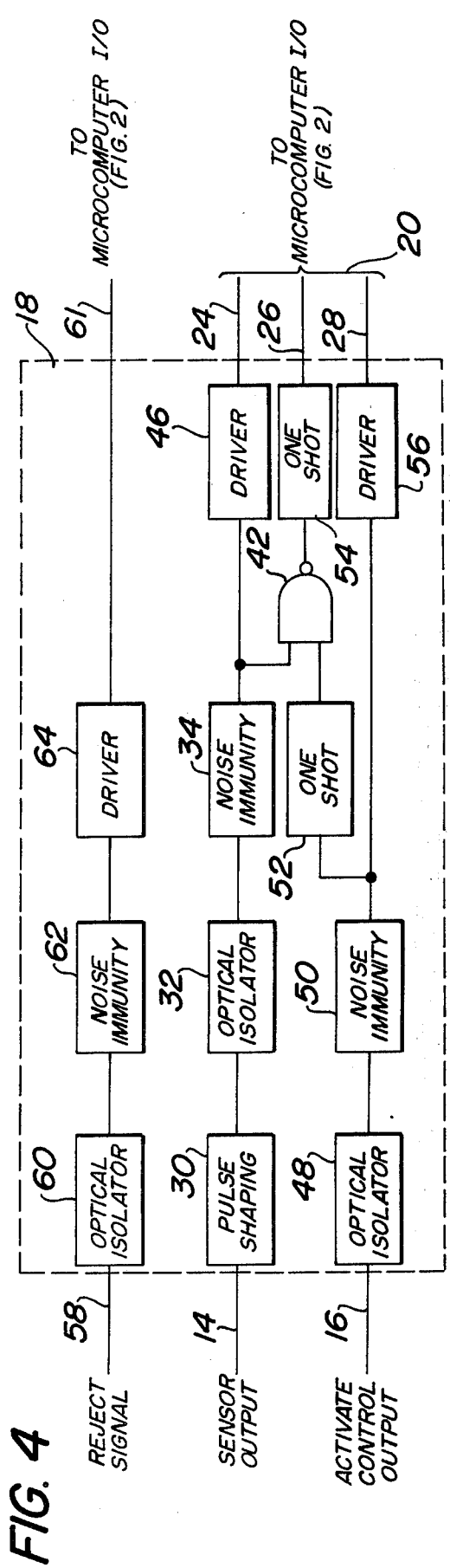
FIG. 4 is an electrical schematic of the signal processing circuit shown in FIG. 2.

Once the Activate signal ends, the system enters the STATUS ON branching step wherein it is determined whether a Status signal 61, FIG. 2, is present at the Status input to the input/output section of the microcomputer. The presence of a Status signal indicates that the bottle under inspection should be rejected. Referring to FIG. 4, the Status signal 61 is generated by signal processing circuit 18 in response to Reject signal 58. Signal 58 is generated in response to the detection of a flaw in the bottle under inspection by a set of sensors and relays as described in U.S. Pat. No. 3,557,950 at column 3, lines 72-end and column 4, lines 1-51. The Reject signal is fed to optical isolator circuit 60, noise immunity circuit 62 and driver circuit 64 which are identical to circuits 32, 34 and 46, respectively. The output of driver circuit 64 is the Status signal 61.

If a Status signal is present at the input/output section of the microcomputer, the Status Flag flip-flop in the central processor unit is set in the SET STATUS FLAG step, FIG. 7B. Control then passes to the RESET ACTIVATE FLAG step wherein the Activate Flag flip-flop is reset. Thereafter, the program will not enter Branch II until the FLAG ACTIVATE and INITIALIZATION routine terminals are passed through. After the Activate Flag flip-flop is reset, control passes to the TIME STAMP ACTIVATE SIGNAL TRAILING EDGE step wherein the clock count at the trailing edge of the Activate signal is stored in the microcomputer memory. The system then enters Junction 3.

FIGS. 7A and 7B represent the Time Stamp portion of the Interrupt program. FIGS. 7C-7F represent the Computation portion of the program. Thus, Junction 3, FIG. 7C, marks the start of the computation of the mold number of the bottle currently inspected. As previously mentioned, Junction 3 is not entered until the Activate signal goes off. The trailing edge of the Activate signal, therefore, marks the end of the inspection run as far as data gathering is concerned. The computation of the bottle mold number is based on the data gathered while the Activate signal was on for a one-half revolution of the bottle.

As shown in FIG. 7C, the Computation portion of the program begins by inspecting the contents of the Interrupt counter in the IF NO INTERRUPS < 2 step. The number of Interrupt signal pulses counted in Branch II, FIG. 7B, is determined by the number of timing marks on the bottle bottom. In the preferred embodiment described herein, for a one-half revolution of the bottle the least number of timing marks 100 in the bottle bottom is three, corresponding to two timing marks in the S or T sector and one timing mark in an intermediate sector, see FIG. 1. The timing marks in the S or T sector are either spaced to provide two close Interrupt signal pulses or a single long Interrupt signal pulse, as compared to the briefer pulses separated by longer inter-pulse spaces which are generated by the timing marks in the intermediate sectors. Thus, assuming that the digital number 0 is not used to identify a bottle, the least number of Interrupt signal pulses logged into the Interrupt counter will be 2, corresponding to one long pulse from the S or T sector and one short pulse from an intermediate sector.

If the number of Interrupt signals counted is < 2, this indicates that the bottle has been incorrectly marked or, if correctly marked, incorrectly read. Accordingly, the program enters Junction II, FIGS. 7C and 7G. Therafter, the time stamp information is cleared from the input area of the microcomputer memory, in the CLEAR MEMORY step, FIG. 7G, and the registers are restored to their status at the last executed instruction in the Console program in the RESTORE STATUS step. The system then returns to the Console program.

If, however, the number of Interrupt signals counted is ≧ 2, indicating that a mold number can be identified based on the data gathered, the program enters the DISCARD 20% OF RUN step, FIG. 7C. It has been determined that, due to non-uniforities in the Interrupt signals arising from the varying speed of rotation of the bottle when it is first being rotated for inspection, roughly 20% of the data at the beginning of the inspection run should be ignored. Thus, all Interrupt signals falling within the first 20% of the run are ignored in the DISCARD 20% OF RUN step. For example, if the leading edge of the Activate signal occurs at the 97th clock pulse and the trailing edge at the 749th, then all Interrupt signals having leading edges which occur at time stamps before 1/5 (749−97) = 130 are ignored. The data stored in the microcomputer memory corresponding to the first 20% of the run will not be used in computing the mold number.

If desired, the non-uniformities in the Interrupt signals due to the varying speed of rotation of the bottle may be compensated for by synchronizing the clock pulses to the speed of rotation of the bottle instead of using a free-running clock. Thus, an encoder 31 (shown in dashed lines in FIG. 2) can be used to generate a train of clock pulses for time stamping the Interrupt signals in synchronism with the rate of rotation of the bottles. Encoder 31 comprises a magnetic pickup and pulse genrator for sensing the rate or rotation of the motor drive shaft which drives the carriages in the bottle detecting mechanism described in U.S. Pat. No. 3,557,950. Accordingly, the pulse repetition rate of the clock pulses generated by encoder 31 will vary in synchronism with the bottle speed, thereby compensating for the non-uniformities in the Interrupt signals cuased by non-uniform speed of rotation of the bottle at the start of an inspection run.

Following the DISCARD 20% OF RUN step, control passes to the COMPUTE PULSE WIDTHS, INTER-PULSE SPACINGS AND CENTERS OF PULSES step. In this step, the remaining data in the microcomputer memory is processed to provide the width of each Interrupt signal pulse, the spacing between Interrupt signal pulses and the center of each Interrupt signal pulse. For example, in Table 1 below it is assumed that the following data is stored in the memory for ½ a rotation of the bottle during a run, where the numbers represent time stamps:

TABLE 1

|  |  | Interrupt Signal Pulse Edges | |
|---|---|---|---|
|  |  | Leading | Trailing |
|  | First | 229 | 241 |
|  | Second | 373 | 383 |
| Interrupt | Third | 455 | 463 |
| Pulse No. | Fourth | 465 | 473 |
|  | Fifth | 531 | 537 |
|  | Sixth | 655 | 663 |
|  | Seventh | 733 | 742 |
|  | Eighth | 745 | 747 |

Activate On = 97
Activate Off = 749

The computations for the pulse widths would be:

| First Pulse | 2nd | 3rd | 4th | 5th | 6th | 7th | 8th |
|---|---|---|---|---|---|---|---|
| 12 | 10 | 8 | 8 | 6 | 8 | 9 | 2 |

For the inter-pulse spacings:

| 1–2nd | 2–3rd | 3–4th | 4–5th | 5–6th | 6–7th | 7–8th |
|---|---|---|---|---|---|---|
| 32 | 72 | 2 | 58 | 118 | 70 | 2 |

And for the centers of the pulses:

| First Pulse | 2nd | 3rd | 4th | 5th | 6th | 7th | 8th |
|---|---|---|---|---|---|---|---|
| 235 | 378 | 459 | 469 | 534 | 659 | 737.5 | 746 |

Based on experience, any pulse width ≦ 2 time stamps can safely be ignored as a spurious signal or a valid signal which was cut-off by the trailing edge of the Activate signal.

After the above computations are made and stored in the working area of the memory, control passes to the SELECT NARROWEST PULSE step wherein the narrowest Interrupt signal pulse, the eighth in the above example, is selected. The program then enters the SUM PULSES < 3 × NARROWEST wherein all pulses less than 3 times as wide as the narrowest pulse are added. In the above example, this computation would reduce to adding all pulses < 3 × 6 = 18 counts wide:

$$\Sigma = 12 + 10 + 8 + 8 + 6 + 8 + 9 = 61$$

Control then passes to the COMPUTE AVERAGE PULSE WIDTH step wherein the average width of the Interrupt pulses is computed and stored in the working area of the memory. In the above example, the computation would be:

Average width = (1/7) (61) = 8.7 counts

The program then enters the SEEK S and T SECTORS step wherein the Interrupt pulses corresponding to the S and T sectors are selected based on the inter-pulse spacings data. In the preferred embodiment herein, inter-pulse spacings are compared to 2% of the difference between the trailing and leading edges of the Activate signal. If a spacing is less than this figure, it indicates the spacing between two timing marks in an S or T sector rather than the spacing between consecutive timing marks in the intermediate sectors. Thus, in the above example, 2% of the Activate signal is 7.04 counts or clock pulses. The third and fourth and the seventh and eighth Interrupt pulses are the only ones having inter-pulse spacings < 7.04 counts. These pulse pairs, therefore, mark the S and T sectors of the bottle, FIG. 1.

Control then passes to the NUMBER branching step, FIG. 7C. In this step, the number of Interrupt pulse pairs selected in the SEEK S AND T SECTORS step determines which branch the program will follow. If the number of pulse pairs selected is one, meaning that only one S or T sector has so far been located, the program enters Junction 5, FIG. 7D; if the number is none, meaning that no S or T sector has so far been located, the program enters Junction 4, FIG. 7E; if the number is two-the ideal condition meaning that both an S and T sector have been located-the program enters Junction 7, FIG. 7F. Thus, Junctions 4 and 5 represent the non-ideal conditions wherein only one or no S or T sectors could be identified in the portion of the program following Junction 3, FIG. 7C. The non-ideal conditions result from a too close spacing of the timing marks in the S or T sector. Thus, the speed at which the bottle is rotated determines a lower limit on the distance separating the two timing marks in the S or T sector. If the marks are too close, the sensor 10 will to be able to differentiate the adjacent edges of the pulses produced by the two timing marks. In other words, there will be no "zero crossing" between the two pulses and they will appear to be joined as a single long pulse. If one of the S and T sectors contains timing marks so spaced, then only one sector will be selected in the SEEK S AND T SECTORS step, FIG. 7C. If both sectors, however, contain such timing marks, then neither S or T sector will be selected in the aforementioned step.

If only one pulse pair is found in the SEEK S AND T SECTORS step, FIG. 7C, the program enters Junction 5 and the SEEK SECOND SECTOR A step, FIG. 7D. In this step, a pulse following the pulse pair already identified, FIG. C, having a width > 1.5 times the average pulse width previously computed is selected as the other S or T sector. The factor of 1.5, like the 20% factor referred to above, is chosen from experience. Other factors may also be empirically derived based on the characteristics of the timing marks, the bottle speed and so forth.

The program then enters the FOUND branching step. If the second S or T sector following the one already selected cannot be found, control passes to the SEEK FOUND SECTOR B step, FIG. 7D, wherein a pulse preceding the pulse pair already identified in the SEEK S AND T SECTORS step, FIG. 7C, and having a width > 1.5 times the average pulse width previously computed is selected as the other S or T sector. Control then passes to the second FOUND step in the flow diagram. If the second S or T sector preceding the one already selected cannot be found in the SEEK SECOND SECTOR B step, the program enters Junction 6. Thus, at Junction 6 the other S or T sector still remains to be identified.

If the pulse is found in the SEEK SECOND SECTOR A step, control passes from the FOUND step to the TREAT AS END SECTOR step wherein the pulse is temporarily stored in the working area of the microcomputer memory as the sector which marks the end of the digital number on the bottle bottom. If, on the other hand, the pulse is found in the SEEK SECOND SECTOR B step, control passes from the FOUND step to the TREAT AS START SECTOR step wherein the pulse is temporarily stored in the working area of the microcomputer memory as the sector which marks the start of the digital numbers on the bottle bottom.

If a pair of Interrupt pulses having an inter-pulse spacing of < 2% of the Activate signal time cannot be found in the SEEK S AND T SECTORS step, FIG. 7C, the program enters Junction 4 as previously mentioned. From Junction 4, the program passes to the SEEK FIRST SECTOR AGAIN step, FIG. 7E. In this step the program looks for a single long Interrupt pulse rather than the Interrupt pulse pair described. Thus, a pulse is selected which has a width > 1.5 times the average pulse width. This pulse represents an S or T sector. Control then passes to the NUMBER branching step. If no such pulse is located in the SEEK FIRST SECTOR AGAIN step the run is considered a failure and the program enters the ASSIGN MOLD NUMBER = 77 step and proceeds to Junction 9. The number 77 is arbitrarily chosen to indicate that the bottle under inspection could not be read. If instead a pulse is located in the SEEK FIRST SECTOR AGAIN step the program enters Junction 6. If two such pulses were located, the program enters Junction 7 as if the ideal condition had been satisfied as in the SEEK S AND T SECTORS step, FIG. 7C.

Assuming that the program has been able to locate both S and T sectors, control passes through Junction 7, FIGS. 7C-7E, to the CALCULATE SLOPE terminal, FIG. 7F, wherein the number of degrees of rotation of the bottle per clock count is calculated by computing the center lines of each S and T sector Interrupt pulse or pulse pair, subtrating the lesser center line from the greater, and dividing the result into 180°. The slope is stored in the working area of the microcomputer memory for use in the next inspection run, if so required, as will be described more fully below. In the above example, the center lines of the S and T sector Interrupt pulse pairs would be:

Center line 1 = [473−455)/2] + 455 = 464

Center line 2 = [(747−733)/2] + 733 = 740

And the slope would be:

Slope = 180/(740−464) = 0.65°/count

The program then enters Junction 8 and the CALCULATE MOLD NO. step in which the first center line, above, is subtracted from the center lines of the Interrupt pulses due to the timing marks in the intermediate sectors following, seriatim, and the result is multiplied by the computed slope and compared to the number of degrees per sector. The number of degrees per sector is a predetermined number stored in the input area of the microcomputer memory. This fixes the location of each Interrupt pulse in the intermediate sectors of the bottle bottom. Depending on the sector location, the pulse is weighted and decoded into its decimal equivalent. Thus, in the above example, the series of subtractions reduces to:

| Fifth Interrupt Pulse to Center line 1 | Sixth Interrupt Pulse to Center line 1 |
|---|---|
| 70 × 0.65 = 45.5° | 195 × 0.65 = 126.75° |

Since, in the preferred embodiment herein, the number of sectors per semi-circle of the bottom bottle is seven (six intermediate sectors in which the identifying number appears in binary and one S or T sector), the number of degrees per sector is (180°/7) = 25.71. Accordingly, it is found that the fifth Intercept pulse lies in the second intermediate sector on the bottle bottom and the sixth interrupt pulse in the fifth intermediate sector. The intermediate sectors are weighted in binary code as shown in Table 2 below:

TABLE 2

|  | Sector | | | | | |
|---|---|---|---|---|---|---|
|  | First | Second | Third | Fourth | Fifth | Sixth |
| Weight $2^0$ | x | | | | | |
| $2^1$ | | x | | | | |
| $2^2$ | | | x | | | |
| $2^3$ | | | | x | | |
| $2^4$ | | | | | x | |
| $2^5$ | | | | | | x |

The weights are stored in the input area of the microcomputer memory. In the above example, then, the mold number is identified as $2^1 + 2^4 = 18$ in decimal notation.

After the mold number is calculated, the program enters the MOLD NO. = 0 branching step. If the computed mold number is not 0, the program jumps to Junction 9 and the DISPLAY MOLD NO. step wherein the mold number is displayed in the Mold No. Display 25, FIG. 2, which may be any suitable digital display compatible with the microcomputer described herein. If, on the other hand, the mold number identified is equal to zero, a forbidden mold number in the preferred embodiment, the program passes to the ASSIGN MOLD NO. = 77 step wherein the mold number is arbitrarily designated as 77 to indicate that the inspection run was a failure. The number 77 is then displayed in the DISPLAY MOLD NO. step.

Referring back to FIGS. 7C-7E, if only one of the S and T sectors could be identified from the data gathered in the current inspection run, the program enters Junction 6 and the USE SLOPE FROM LAST RUN terminal, FIG. 7E, wherein the slope calculated in the last inspection run and stored in the microcomputer memory is retrieved for use in calculating the current bottle mold number. In particular, in this step the slope computed for the last run is divided into 170° to find the range of time stamps within which all data with respect to the intermediate sectors must occur in a ½ rotation of the bottle. As already explained, the span from the beginning of an S sector to the beginning of a T sectors, including the six intermediate sectors, is 180°In the preferred embodiment herein, each sector spans 25.71°Thus, a span of 170° from the center line of the Interrupt pulse or pulse pair corresponding to an S or T sector will include all Interrupt pulses corresponding to the six intermediate sectors in a semi-circle on the bottle bottom. In the above example, then, all data from which the mold number can be identified is located within (170°/0.65) = 261.5 clock counts or time stamps. The computed range of time stamps is stored in the working area of the microcomputer memory.

After executing the USE SLOPE FROM LAST RUN step, the program enters the ARRANGE INTERRUPTS terminal wherein the Interrupt based on the symmetrical placement of sectors on the bottle bottom, so that the mold number can later be calculated in the CALCULATE MOLD NO. step previously described. In the ARRANGE INTERRUPTS terminal, the following operations are executed:

1. The number of time stamps corresponding to 170° is added to the center line of the only S or T sector known - this serves as an upper limit in re-locating all Interrupt pulses arising from intermediate sector timing marks preceding the S or T sector Interrupt pulse or pulse pair;

2. The number of time stamps corresponding to 180° is added to the center lines of all Interrupt pulses arising from intermediate sector timing marks preceding the S or T sector pulse or pulse pair; and 3. Interrupt pulses arising from intermediate sector timing marks following the S or T sector pulse or pulse pair but not prior to the earliest re-arranged Interrupt pulse are ignored. For example, assume in Table 3 the following time stamps history for ½ rotation of the bottle:

TABLE 3

|  |  | Interrupt Pulse Edges | |
|---|---|---|---|
|  |  | Leading | Trailing |
| Interrupt Pulse No. | First | 50 | 60 |
|  | Second | 90 | 100 |
|  | Third | 130 | 140 |
|  | Fourth | [170 | 190] |
|  | Fifth | 250 | 260 |
|  | Activate On = 10 | | |
|  | Activate Off = 330 | | |

The only known S or T sector is indicated by the pulse extending over 170 - 190 counts or time stamps since this is greater than 1.5 times the average pulse width which is 10 counts. There are three Interrupt pulses preceding this sector and one following it.

Using the previously calculated slope of 0.65°/count 170° of rotation is equivalent to 255 counts. Thus, all Interrupt pulses corresponding to the intermediate sectors of interest will lie within 180 counts (center line of S or T sector shown in brackets in Table 3) to 435 counts. The Interrupt pulses preceding the S or T sector pulse are brought forward by adding 270 counts (the equivalent of 180° based on a slope of 0.65°/count to their center lines. The re-arranged time stamp history of the Interrupt pulse is shown in Table 4 below:

TABLE 4

|  | Interrupt Pulse Edges | |
|---|---|---|
|  | Leading | Trailing |
| First | [170 | 190] |
| Second | 250 | 260 |
| Third | 320 | 330 |
| Fourth | 360 | 370 |
| Fifth | 410 | [435] |

The bracket number pair represents the known S or T sector and the bracketed number [435] represents the upper limit of the Interrupt pulses. These counts are then stored in the working area of the microcomputer memory.

The program then enters Junction 8 and the CALCULATE MOLD NO. step, FIG. 7F. The center line of the known S or T sector pulse or pulse pair is subtracted from the center line of each Interrupt pulse as re-arranged, the result is multiplied by the slope calculated in the previous run, and each Interrupt pulse is fixed at a particular intermediate sector on the bottle bottom, all as previously described. If the mold number identified is valid, that is, not zero, then the number is displayed digitally in the DISPLAY MOLD NO. step.

Control then passes to Junction 10 and the FLAG REJECT step, FIG. 7G, where the Reject Flag flip-flop in the central processor unit is insepected. The Reject Flag flip-flop is set by Status signal 61, FIG. 4, to indicate that the bottle currently being inspected must be rejected. The Status signal is generated by the operator by depressing the appropriate key to the teletype keyboard 23, FIG. 2. If the Reject Flag flip-flop has been set by the Status signal, the program bypasses the DISPLAY LIGHT AND EJECTOR step, and enters the ACCUMULATE REJECT COUNT BY MOLD NO. step. The Status signal activates an Ejector mechanism 29 for ejecting the bottle. under inspection such as the ejector mechanism described in U.S. Pat. No. 3,557,950 at column 4, lines 11-end and column 4, lines 1-21.

Thereafter, control passes to the ACCUMULATE REJECT COUNT BY MOLD NO. step, FIG. 7G, wherein the mold number of the rejected bottle is stored in the microcomputer memory and the Reject Counter in the central processor unit is incremented by one count. The Reject Counter counts the number of rejected bottles for a series of inspection runs.

Control then passes to the FLAG TIME STAMP steps wherein the Time Stamp Flag flip-flop in the central processor unit is inspected. As previously explained, the Time Stamp Flag flip-flop indicates that a time stamp report is requested by the operator. The flip-flop is set by depressing keyboard character T, FIG. 6. If the flip-flop has been set, the program enters the STORE TIME STAMPS AND MOLD NO. IN OUTPUT AREA step. In this step, the time stamps or clock counts for the leading and trailing edges of the Interrupt pulses, as well as the leading and trailing edges of the Activate signal, together with the computed mold number, are brought to the output area of the microcomputer memory for use in printing out the time stamp report further on in the program.

The system then enters the HAVE X BOTTLES PASSED branching step where X can be any predetermined number of bottles, hence inspection runs, for which a report is to be printed. If the predetermined number of bottles has passed through the inspection area, the program passes to the PRINT AND CLEAR step. In this step the information stored in the memory output area, namely the time stamps and mold numbers for X inspection runs, is printed out and the memory working area is cleared. Control then passes to Junction 11 and the CLEAR INPUT AREA step wherein the memory input area is cleared.

The system then enters the RESTORE STATUS step. In this step the centralprocessor unit registers are restored to their status at the last executed instruction in the Console program. The system then returns to the next instruction of the Console program.

If the Time Stamp Flag flip-flop had not been set as of the FLAG TIME STAMP step, that is, if no report had been requested at that time, or alternatively if the required number of bottles, X, had not been inspected as of the HAVE X BOTTLES PASSED step, then the program skips to Junction 11, FIG. 7G, and no report is printed. Thereafter, the input area of the memory is cleared, the registers are restored and the Console program is re-entered.

If the Reject Flag flip-flop had not been set as of the FLAG REJECT step, the program enters the COMPARE COMPUTED AND STORED MOLD NOS. branching step. If the computed mold number is identical to a stored mold number in the updated memory file, the program enters the DISPLAY LIGHT AND EJECTOR step wherein a DISPLAY LIGHT 27 and Ejector Mechanism 29 are activated by the input/output section of the microcomputer, see FIG. 2.

The program then enters the ACCUMULATE REJECTED COUNT BY MOLD NO. step and the sequence of operations previously described in respect to the Reject Flag flip-flop being set is executed. If, however, the computed mold number is not identical to any of the stored mold numbers, the program enters the ACCUMULATE ACCEPT COUNT BY MOLD NO. step in which the Accept counter in the central processor unit is incremented by one count and the computed mold number is stored. The Accept counter counts the number of accepted bottles for a series of inspection runs. Thereafter, control passes to the FLAG TIME STAMP step and operation proceeds as previously described.

A program, written in PL/M and Assembler languages, for controlling the operation of the microcomputer 22 disclosed herein for on-line identification of the mold source of a bottle and storage of a running log of the identity and status of each bottle in an entire procession of bottles is shown below. The program represents one suitable set of instructions for performing the operations disclosed in the flow diagrams in FIGS. 6 and 7A-7G as indicated by the marginal headings. It should be understood that the program may be modified by persons skilled in the program art to effect additional or related operations by microcomputer 22 in identifying a bottle and providing a running log of the information computed within the scope of the present invention.

The microcomputer utilized in the present invention is an Intel MCS-80 microcomputer. Other programmable computers may, however, be substituted for the Intel MCS-80. In addition, other programming languages may be used for the programs disclosed herein without departing from the scope of the invention.

```
;
; AUTOMATIC CAVITY IDENTIFICATION PROGRAM
; FOR INTEL 8080
;
;
0000    C31B00      JMP START
0018                ORG 18H
0018    C39C00      JMP INTRT
001B                START:
001B    F3          DI
001C    31A01F      LXI SP,1FA0H
001F    210010      LXI H,1000H
0022    0E0F        MVI C,15
0024                SETZO:
0024    06FF        MVI B,255
0026    3600        MVI M,0
0028    23          INX H
```

|  | 0029 | 05 | DCR B |
|---|---|---|---|
|  | 002A | C22600 | JNZ $-4 |
|  | 002D | 0D | DCR C |
|  | 002E | C22400 | JNZ SETZO |
|  | 0031 | 217D15 | LXI H,RJSTA |
| Console | 0034 | 0640 | MVI B,64 |
| Program/ | 0036 | 3680 | MVI M,80H |
| Figure 6 | 0038 | 23 | INX H |
|  | 0039 | 05 | DCR B |
|  | 003A | C23600 | JNZ $-4 |
|  | 003D | 211913 | LXI H,HEXBF |
|  | 0040 | 0604 | MVI B,4 |
|  | 0042 | 3620 | MVI M,20H |
|  | 0044 | 23 | INX H |
|  | 0045 | 05 | DCR B |
|  | 0046 | C24200 | JNZ $-4 |
|  | 0049 | 21C211 | LXI H,TABLE |
|  | 004C | 22C215 | SHLD ADRWK |
|  | 004F | 21DB15 | LXI H,STORE |
|  | 0052 | 220A13 | SHLD STADR |
|  | 0055 | 210D13 | LXI H,SMOLD |
|  | 0058 | 221713 | SHLD MOLDA |
|  | 005B | CD6702 | CALL ENTR |
|  | 005E | CDA302 | CALL ENJOB |
|  | 0061 | 3E0A | MVI A,10 |
|  | 0063 | 320C13 | STA BCNT |
|  | 0066 | FB | EI |
|  | 0067 | CD1238 | TEST: CALL CSTS |
|  | 006A | 0F | RRC |
|  | 006B | DCB603 | CC INQRY |
|  | 006E | C36700 | JMP TEST |
|  |  |  | ; |
|  |  |  | ; MOLD NO. O/P SUB-ROUTINE |
|  |  |  | ; |
|  | 0071 |  | NOOUT: |
|  | 0071 | D5 | PUSH D |
|  | 0072 | 32CA15 | STA BINCH |
|  | 0075 | 3E06 | MVI A,06H |
| Display | 0077 | 11CA15 | LXI D,BINCH |
| Mold | 007A | 21C415 | LXI H,BCDBF |
| No./ | 007D | CDDF02 | CALL TOBCD |
| Figure 7F | 0080 | 23 | INX H |
|  | 0081 | 7E | MOV A,M |
|  | 0082 | 3600 | MVI M,0 |
|  | 0084 | 23 | INX H |
|  | 0085 | 07 | RLC |
|  | 0086 | 07 | RLC |
|  | 0087 | 07 | RLC |
|  | 0088 | 07 | RLC |
|  | 0089 | B6 | ORA M |
|  | 008A | 3600 | MVI M,0 |
|  | 008C | D1 | POP D |
|  | 008D | B2 | ORA D |
|  | 008E | D303 | OUT 3 |
|  | 0090 | C9 | RET |
|  |  |  | ; |
|  |  |  | ; CARRIAGE RETURN AND LINE FEED SUB-ROUTINE |
|  |  |  | ; |
| Console | 0091 |  | CRLNF: |
| Program | 0091 | 0E0D | MVI C,0DH |
| Figure 6 | 0093 | CD0938 | CALL CO |
|  | 0096 | 0E0A | MVI C,0AH |
|  | 0098 | CD0938 | CALL CO |
|  | 009B | C9 | RET |
|  |  |  | ; |
|  |  |  | ; INTERRUPT SERVICE ROUTINE - PORT THREE (3) |
|  |  |  | ; |
|  | 009C |  | INTRT: |
|  | 009C | F5 | PUSH PSW |
|  | 009D | C5 | PUSH B |
| Interrupt | 009E | D5 | PUSH D |
| Program/ | 009F | E5 | PUSH H |
| Figure 7A | 00A0 | DB03 | IN 3 |
|  | 00A2 | 0F | RRC |
|  | 00A3 | D2AC00 | JNC ACTON ; JUMP ACTIVATE ON |
|  | 00A6 | E1 | POP H |
|  | 00A7 | D1 | POP D |

|  | 00A8 | C1 | POP B |
|---|---|---|---|
|  | 00A9 | F1 | POP PSW |
|  | 00AA | FB | EI |
|  | 00AB | C9 | RET |
| Interrupt | 00AC |  | ACTON: |
| Program/ | 00AC | 4F | MOV C,A |
| Figure 7B | 00AD | 21C115 | LXI H,SW1 |
|  | 00B0 | 3E00 | MVI A,00H |
|  | 00B2 | BE | CMP M |
|  | 00B3 | C2E700 | JNZ SWON ; SWITCH ON |
|  | 00B6 | 3601 | MVI M,01H |
|  | 00B8 | 3E00 | MVI A,00H |
|  | 00BA | 32E612 | STA MOLD |
|  | 00BD | 322612 | STA IPTCT |
|  | 00C0 | AF | XRA A |
|  | 00C1 | CDC101 | CALL GTTM |
|  | 00C4 | 7D | MOV A,L |
|  | 00C5 | AB | XRA E |
|  | 00C6 | C2CE00 | JNZ RDAGN |
|  | 00C9 | 7C | MOV A,H |
|  | 00CA | AA | XRA D |
|  | 00CB | CAD100 | JZ RDOK |
|  | 00CE |  | RDAGN: |
|  | 00CE | CDC901 | CALL GTTM1 |
|  | 00D1 |  | RDOK: |
|  | 00D1 | 2AC215 | LHLD ADRWK |
|  | 00D4 | 73 | MOV M,E |
| Interrupt | 00D5 | 23 | INX H |
| Program/ | 00D6 | 72 | MOV M,D |
| Figure 7B | 00D7 | 23 | INX H |
|  | 00D8 | 22C215 | SHLD ADRWK |
|  | 00DB | 3E80 | MVI A,80H |
|  | 00DD | D303 | OUT 3 |
|  | 00DF | 3E01 | MVI A,1 |
|  | 00E1 | D301 | OUT 1 |
|  | 00E3 | FB | EI |
|  | 00E4 | C30B01 | JMP LOOPA |
|  | 00E7 |  | SWON: |
|  | 00E7 | 79 | MOV A,C |
|  | 00E8 | 0F | RRC |
|  | 00E9 | DA0501 | JC GETOT |
|  | 00EC | 3A2612 | LDA IPTCT |
|  | 00EF | FE18 | CPI 24 |
|  | 00F1 | CA0501 | JZ GETOT |
|  | 00F4 | 3C | INR A |
|  | 00F5 | 322612 | STA IPTCT |
|  | 00F8 | CD9201 | CALL STAMP |
|  | 00FB |  | AGX2: |
|  | 00FB | DB03 | IN 3 |
|  | 00FD | 0F | RRC |
|  | 00FE | 0F | RRC |
|  | 00FF | D2FB00 | JNC AGX2 |
|  | 0102 | CD9201 | CALL STAMP |
|  | 0105 |  | GETOT: |
|  | 0105 | E1 | POP H |
|  | 0106 | D1 | POP D |
|  | 0107 | C1 | POP B |
|  | 0108 | F1 | POP PSW |
|  | 0109 | FB | EI |
|  | 010A | C9 | RET |
|  | 010B |  | LOOPA: |
|  | 010B | DB03 | IN 3 |
|  | 010D | 0F | RRC |
|  | 010E | DA1401 | JC END1 ; ACTIVATE OFF |
| Interrupt | 0111 | C30B01 | JMP LOOPA |
| Program/ | 0114 |  | END1: |
| Figure 7B | 0114 | F3 | DI |
|  | 0115 | 0F | RRC |
|  | 0116 | 0F | RRC |
|  | 0117 | D21F01 | JNC $+8 |
|  | 011A | 3E00 | MVI A,0 |
|  | 011C | 322614 | STA RJSW |
|  | 011F | 3E00 | MVI A,00H |
|  | 0121 | 32C115 | STA SW1 |
|  | 0124 | 3A2612 | LDA IPTCT |
|  | 0127 | FE02 | CPI 2 |

|  | | | |
|---|---|---|---|
| | 0129 | DA8601 | JC NT2 ; FALSE ACTIVITE |
| | 012C | CD9201 | CALL STAMP |
| | 012F | CD0005 | CALL CLCMD |
| | 0132 | CDD201 | CALL STATS |
| | 0135 | 3ADA15 | LDA TSW |
| | 0138 | 0F | RRC |
| | 0139 | D25E01 | JNC NT1 |
| | 013C | 2A1713 | LHLD MOLDA |
| | 013F | 3AE612 | LDA MOLD |
| | 0142 | 77 | MOV M,A |
| | 0143 | 23 | INX H |
| Interrupt | 0144 | 221713 | SHLD MOLDA |
| Output | 0147 | 2A0A13 | LHLD STADR |
| Program/ | 014A | EB | XCHG |
| Figure 7G | 014B | 21C211 | LXI H,TABLE |
| | 014E | 3E64 | MVI A,100 |
| | 0150 | | LOOPB: |
| | 0150 | 46 | MOV B,M |
| | 0151 | EB | XCHG |
| | 0152 | 70 | MOV M,B |
| | 0153 | EB | XCHG |
| | 0154 | 23 | INX H |
| | 0155 | 13 | INX D |
| | 0156 | 3D | DCR A |
| | 0157 | C25001 | JNZ LOOPB |
| | 015A | EB | XCHG |
| | 015B | 220A13 | SHLD STADR |
| | 015E | | NT1: |
| | 015E | 21C211 | LXI H,TABLE |
| | 0161 | 3E64 | MVI A,100 |
| | 0163 | 32CB15 | STA COUN1 |
| | 0166 | | LOOPC: |
| | 0166 | 7E | MOV A,M |
| | 0167 | 3E00 | MVI A,00H |
| | 0169 | 77 | MOV M,A |
| | 016A | 23 | INX H |
| | 016B | 3ACB15 | LDA COUN1 |
| | 016E | 3D | DCR A |
| | 016F | 32CB15 | STA COUN1 |
| | 0172 | C26601 | JNZ LOOPC |
| | 0175 | 3ADA15 | LDA TSW |
| Interrupt | 0178 | 0F | RRC |
| Output | 0179 | D28601 | JNC NT2 |
| Program/ | 017C | 3A0C13 | LDA BCNT |
| Figure 7G | 017F | 3D | DCR A |
| | 0180 | 320C13 | STA BCNT |
| | 0183 | CCD833 | CZ PRINT |
| | 0186 | | NT2: |
| | 0186 | 2A5635 | LHLD ADTAB |
| | 0189 | 22C215 | SHLD ADRWK |
| | 018C | FB | EI |
| | 018D | E1 | POP H |
| | 018E | D1 | POP D |
| | 018F | C1 | POP B |
| | 0190 | F1 | POP PSW |
| | 0191 | C9 | RET |
| | | | ; |
| | | | ; TIME STAMP PULSE ROUTINE |
| | | | ; |
| | 0192 | | STAMP: |
| | 0192 | AF | XRA A |
| | 0193 | CDC101 | CALL GTTM |
| | 0196 | 7D | MOV A,L |
| | 0197 | AB | XRA E |
| | 0198 | C2A001 | JNZ RDAG1 |
| Interrupt | 019B | 7C | MOV A,H |
| Program/ | 019C | AA | XRA D |
| Figure 7B | 019D | CAA301 | JZ RDOK1 |
| | 01A0 | | RDAG1: |
| | 01A0 | CDC901 | CALL GTTM1 |
| | 01A3 | | RDOK1: |
| | 01A3 | 2AC215 | LHLD ADRWK |
| | 01A6 | 2B | DCX H |
| | 01A7 | 2B | DCX H |
| | 01A8 | AF | XRA A |
| | 01A9 | 7B | MOV A,E |

|  | | | |
|---|---|---|---|
|  | 01AA | 9E | SBB M |
|  | 01AB | 7A | MOV A,D |
|  | 01AC | 23 | INX H |
|  | 01AD | 9E | SBB M |
|  | 01AE | D2B601 | JNC CLKOK |
|  | 01B1 | 210004 | LXI H,1024 |
|  | 01B4 | 19 | DAD D |
|  | 01B5 | EB | XCHG |
|  | 01B6 |  | CLKOK: |
|  | 01B6 | 2AC215 | LHLD ADRWK |
|  | 01B9 | 73 | MOV M,E |
|  | 01BA | 23 | INX H |
|  | 01BB | 72 | MOV M,D |
|  | 01BC | 23 | INX H |
|  | 01BD | 22C215 | SHLD ADRWK |
|  | 01C0 | C9 | RET |
|  |  |  | ; |
|  |  |  | ; READ TIMER ROUTINE |
|  |  |  | ; |
|  | 01C1 |  | GTTM: |
|  | 01C1 | DB07 | IN 7 |
|  | 01C3 | 6F | MOV L,A |
|  | 01C4 | DB05 | IN 5 |
|  | 01C6 | E603 | ANI 3 |
|  | 01C8 | 67 | MOV H,A |
|  | 01C9 |  | GTTM1: |
|  | 01C9 | DB07 | IN 7 |
|  | 01CB | 5F | MOV E,A |
|  | 01CC | DB05 | IN 5 |
|  | 01CE | E603 | ANI 3 |
|  | 01D0 | 57 | MOV D,A |
|  | 01D1 | C9 | RET |
|  |  |  | ; |
|  |  |  | ; STORE PRODUCTION STATISTICS ROUTINE |
|  |  |  | ; |
|  | 01D2 |  | STATS: |
|  | 01D2 | 3AE612 | LDA MOLD |
|  | 01D5 | 1680 | MVI D,80H |
|  | 01D7 | FE4D | CPI 77 |
|  | 01D9 | CAEE01 | JZ NORD1 |
|  | 01DC | 4F | MOV C,A |
|  | 01DD | 0600 | MVI B,0 |
|  | 01DF | 217D15 | LXI H,RJSTA |
|  | 01E2 | 09 | DAD B |
|  | 01E3 | 3A2614 | LDA RJSW |
|  | 01E6 | 07 | RLC |
|  | 01E7 | D2EE01 | JNC NORD1 |
|  | 01EA | 3E00 | MVI A,0 |
|  | 01EC | B6 | ORA M |
|  | 01ED | 57 | MOV D,A |
|  | 01EE |  | NORD1: |
|  | 01EE | E5 | PUSH H |
|  | 01EF | 3AE612 | LDA MOLD |
|  | 01F2 | CD7100 | CALL NOOUT |
|  | 01F5 | E1 | POP H |
|  | 01F6 | 3AE612 | LDA MOLD |
|  | 01F9 | FE4D | CPI 77 |
|  | 01FB | CA4602 | JZ NORD2 |
|  | 01FE | 3A2614 | LDA RJSW |
|  | 0201 | 07 | RLC |
|  | 0202 | D21802 | JNC CKADD |
|  | 0205 | 7E | MOV A,M |
|  | 0206 | 07 | RLC |
|  | 0207 | DA2602 | JC RJOFF |
|  | 020A | 2ACC15 | LHLD MDSRJ |
|  | 020D | 1600 | MVI D,0 |
|  | 020F | 1E01 | MVI E,1 |
|  | 0211 | 19 | DAD D |
|  | 0212 | 22CC15 | SHLD MDSRJ |
|  | 0215 | C32C02 | JMP RJON |
|  | 0218 |  | CKADD: |
|  | 0218 | 2AD015 | LHLD CKRJ |
|  | 021B | 1600 | MVI D,0 |
|  | 021D | 1E01 | MVI E,1 |
|  | 021F | 19 | DAD D |
|  | 0220 | 22D015 | SHLD CKRJ |
|  | 0223 | C32C02 | JMP RJON |

Interrupt Program/ Figure 7B

Interrupt Output Program/ Figure 7G

|  |  |  |  |
|---|---|---|---|
|  | 0226 |  | RJOFF: |
|  | 0226 | 217D14 | LXI H,CNTP |
|  | 0229 | C32F02 | JMP S+6 |
| Interrupt | 022C |  | RJON: |
| Output | 022C | 21FD14 | LXI H,CNTR |
| Program/ | 022F | EB | XCHG |
| Figure 7G | 0230 | 3AE612 | LDA MOLD |
|  | 0233 | 6F | MOV L,A |
|  | 0234 | 2600 | MVI H,0 |
|  | 0236 | 29 | DAD H |
|  | 0237 | 19 | DAD D |
|  | 0238 | 23 | INX H |
|  | 0239 | AF | XRA A |
|  | 023A | 3E01 | MVI A,1 |
|  | 023C | 8E | ADC M |
|  | 023D | 77 | MOV M,A |
|  | 023E | 3E00 | MVI A,0 |
|  | 0240 | 2B | DCX H |
|  | 0241 | 8E | ADC M |
|  | 0242 | 77 | MOV M,A |
|  | 0243 | C36102 | JMP ANORD |
|  | 0246 |  | NORD2: |
|  | 0246 | 3A2614 | LDA RJSW |
|  | 0249 | 07 | RLC |
|  | 024A | D25302 | JNC S+9 |
|  | 024D | 01BD15 | LXI B,NORDP |
|  | 0250 | C35602 | JMP S+6 |
|  | 0253 | 01BF15 | LXI B,NORDR |
|  | 0256 | 03 | INX B |
|  | 0257 | AF | XRA A |
|  | 0258 | 0A | LDAX B |
|  | 0259 | CE01 | ACI 1 |
|  | 025B | 02 | STAX B |
|  | 025C | 0B | DCX B |
|  | 025D | 0A | LDAX B |
|  | 025E | CE00 | ACI 0 |
| Interrupt | 0260 | 02 | STAX B |
| Output | 0261 |  | ANORD: |
| Program/ | 0261 | 3E80 | MVI A,80H |
| Figure 7G | 0263 | 322614 | STA RJSW |
|  | 0266 | C9 | RET |
|  | 0267 | CD9100 | ENTR: CALL CRLNF |
|  | 026A | 21C435 | LXI H,HEAD1 |
|  | 026D | 061C | MVI B,1CH |
|  | 026F | CD3435 | CALL STPNT |
|  | 0272 | 010013 | LXI B,DATE |
|  | 0275 | 1608 | MVI D,08H |
|  | 0277 | CD0338 | LOOP3: CALL CI |
|  | 027A | 02 | STAX B |
|  | 027B | 03 | INX B |
|  | 027C | 15 | DCR D |
|  | 027D | C27702 | JNZ LOOP3 |
|  | 0280 | CD9100 | CALL CRLNF |
|  | 0283 | 210013 | LXI H,DATE |
|  | 0286 | 0608 | MVI B,8 |
|  | 0288 | CD3435 | CALL STPNT |
|  | 028B | CD9100 | CALL CRLNF |
|  | 028E | 212B36 | LXI H,HEAD3 |
| Console | 0291 | 062D | MVI B,2DH |
| Program/ | 0293 | CD3435 | CALL STPNT |
| Figure 6 | 0296 | CD0338 | CALL CI |
|  | 0299 | 0ED9 | MVI C,0D9H |
|  | 029B | B9 | CMP C |
|  | 029C | C26702 | JNZ ENTR |
|  | 029F | CD9100 | CALL CRLNF |
|  | 02A2 | C9 | RET |
|  | 02A3 |  | ENJOB: |
|  | 02A3 | CD9100 | CALL CRLNF |
|  | 02A6 | 21F236 | LXI H,CON10 |
|  | 02A9 | 0620 | MVI B,32 |
|  | 02AB | CD3435 | CALL STPNT |
|  | 02AE | 012F14 | LXI B,JBNO |
|  | 02B1 | 1604 | MVI D,4 |
|  | 02B3 | CD0338 | JLOP2: CALL CI |
|  | 02B6 | 02 | STAX B |
|  | 02B7 | 03 | INX B |
|  | 02B8 | 15 | DCR D |

```
                    02B9   C2B302   JNZ JLOP2
                    02BC   CD9100   CALL CRLNF
                    02BF   212F14   LXI H,JBNO
                    02C2   0604     MVI B,4
                    02C4   CD3435   CALL STPNT
                    02C7   CD9100   CALL CRLNF
                    02CA   211237   LXI H,CON14
                    02CD   062E     MVI B,46
                    02CF   CD3435   CALL STPNT
                    02D2   CD0338   CALL CI
Console             02D5   0ED9     MVI C,0D9H
Program/            02D7   B9       CMP C
Figure 6            02D8   C2A302   JNZ ENJOB
                    02DB   CD9100   CALL CRLNF
                    02DE   C9       RET
                                    ;***********************
                                    ; BINARY TO BCD ROUTINE
                                    ;***********************
                                    ;
                                    ;
                    02DF            TOBCD:
                    02DF   32D615   STA NBIT
                    02E2   D5       PUSH D
                    02E3   E5       PUSH H
                    02E4   EB       XCHG
                    02E5   22D415   SHLD SBIN
                                    ;
                                    ; TEST IF BINARY VALUE IS ZEROO
                                    ;
                    02E8   AF       XRA A
Interrupt  02E9     7E              MOV A,M
 Output    02EA     2B              DCX H
Program/   02EB     8E              ADC M
Figure 7G  02EC     2B              DCX H
           02ED     8E              ADC M
                    02EE   CA5E03   JZ EXIT
                    02F1   EB       XCHG
                    02F2   3AD615   LDA NBIT
                    02F5   FE18     CPI 24
                    02F7   CA1B03   JZ TEN7
                    02FA   FE12     CPI 18
                    02FC   D22303   JNC TEN6
                    02FF   FE0F     CPI 15
                    0301   D22B03   JNC TEN5
                    0304   FE0C     CPI 12
                    0306   D23303   JNC TEN4
                    0309   FE08     CPI 8
                    030B   D23B03   JNC TEN3
                    030E   FE06     CPI 6
                    0310   D24303   JNC TEN2
                    0313   FE03     CPI 3
                    0315   D24B03   JNC TEN1
                    0318   C35303   JMP TEN0
                                    ;
                                    ; BEGIN CONVERSION
                                    ;
                    031B   1698     TEN7: MVI D,98H
                    031D   018096   LXI B,9680H
                    0320   CD6103   CALL DIGIT
                    0323   160F     TEN6: MVI D,0FH
                    0325   014042   LXI B,4240H
                    0328   CD6103   CALL DIGIT
                    032B   1601     TEN5: MVI D,1
                    032D   01A086   LXI B,86A0H
                    0330   CD6103   CALL DIGIT
                    0333   1600     TEN4: MVI D,0
                    0335   011027   LXI B,10000
                    0338   CD6103   CALL DIGIT
                    033B   1600     TEN3: MVI D,0
                    033D   01E803   LXI B,1000
                    0340   CD6103   CALL DIGIT
                    0343   1600     TEN2: MVI D,0
                    0345   016400   LXI B,100
                    0348   CD6103   CALL DIGIT
                    034B   1600     TEN1: MVI D,0
                    034D   010A00   LXI B,10
                    0350   CD6103   CALL DIGIT
```

```
                                            TEN0:  MVI D,0
Interrupt    0353    1600                          LXI B,1
 Output      0355    010100                        CALL DIGIT
Program/     0358    CD6103                        JMP EXIT
Figure 7G    035B    C35E03              EXIT:
             035E                                  POP H
             035E    E1                            POP D
             035F    D1                            RET
             0360    C9                   ;
                                          ;
                                          ; SUBTRACTION ROUTINE
                                          ;
             0361                         DIGIT:
             0361    3600                        MVI M,0
             0363    E5                          PUSH H
             0364                         SUB1:
             0364    2AD415                      LHLD SBIN
             0367    7E                          MOV A,M
             0368    91                          SUB C
             0369    77                          MOV M,A
             036A    2B                          DCX H
             036B    7E                          MOV A,M
             036C    98                          SBB B
             036D    77                          MOV M,A
             036E    2B                          DCX H
             036F    7E                          MOV A,M
             0370    9A                          SBB D
             0371    77                          MOV M,A
             0372    7A                          MOV A,D
             0373    DA7D03                      JC RSTR
             0376    E1                          POP H
             0377    34                          INR M
             0378    E5                          PUSH H
             0379    57                          MOV D,A
-----------  037A    C36403                      JMP SUB1
                                          ;
                                          ; RESTORE ROUTINE
                                          ;
             037D                         RSTR:
             037D    57                          MOV D,A
             037E    2AD415                      LHLD SBIN
Interrupt    0381    7E                          MOV A,M
 Output      0382    81                          ADD C
Program/     0383    77                          MOV M,A
Figure 7G    0384    2B                          DCX H
             0385    7E                          MOV A,M
             0386    88                          ADC B
             0387    77                          MOV M,A
             0388    2B                          DCX H
             0389    7E                          MOV A,M
             038A    8A                          ADC D
             038B    77                          MOV M,A
             038C    E1                          POP H
             038D    23                          INX H
-----------  038E    C9                          RET
                                          ;
                                          ;*******************
                                          ; BCD TO BIN ROUTINE
                                          ;*******************
                                          ;
             038F                         BCDBIN:
             038F    4F                          MOV C,A
             0390    210000                      LXI H,0
             0393    AF                          XRA A
             0394                         LOOP:
             0394    CD9D03                      CALL BCD
             0397    13                          INX D
Console      0398    0D                          DCR C
Program/     0399    C29403                      JNZ LOOP
Figure 6     039C    C9                          RET
                                          ;
                                          ; *10 ROUTINE
                                          ;
             039D                         BCD:
             039D    D5                          PUSH D
             039E    E5                          PUSH H
             039F    47                          MOV B,A
             03A0    29                          DAD H
```

```
                03A1    8F          ADC A
                03A2    29          DAD H
                03A3    8F          ADC A
                03A4    D1          POP D
                03A5    19          DAD D
                03A6    88          ADC B
                03A7    29          DAD H
                03A8    8F          ADC A
                03A9    47          MOV B,A
                03AA    D1          POP D
                03AB    1A          LDAX D
                03AC    85          ADD L
                03AD    6F          MOV L,A
                03AE    7C          MOV A,H
                03AF    CE00        ACI 0
                03B1    67          MOV H,A
                03B2    78          MOV A,B
                03B3    CE00        ACI 0
                03B5    C9          RET
                                    ;
                                    ; INQUIRY ROUTINE
                                    ;
                03B6                INQRY:
                03B6    113E35      LXI D,BHTAB
                03B9    CD0338      CALL CI
                03BC    E67F        ANI 7FH
                03BE    214E35      LXI H,CDTAB
                03C1    0607        MVI B,7
                03C3                COMP:
                03C3    BE          CMP M
                03C4    CACE03      JZ GETAD
                03C7    23          INX H
                03C8    13          INX D
                03C9    13          INX D
                03CA    05          DCR B
                03CB    C2C303      JNZ COMP
                03CE                GETAD:
                03CE    EB          XCHG
                03CF    5E          MOV E,M
                03D0    23          INX H
                03D1    56          MOV D,M
                03D2    EB          XCHG
                03D3    E9          PCHL
                                    ;
                                    ; MOLD SORT ROUTINE
                                    ;
                03D4                MOLDI:
                03D4    CD9100      CALL CRLNF
                03D7    215835      LXI H,CON1
                03DA    0621        MVI B,33
                03DC    CD3435      CALL STPNT
                03DF    CD0338      CALL CI
                03E2    4F          MOV C,A
                03E3    E670        ANI 70H
                03E5    FE30        CPI 30H
                03E7    79          MOV A,C
                03E8    CAED03      JZ NOOK1
                03EB    3E0F        MVI A,0FH
                03ED                NOOK1:
                03ED    E60F        ANI 0FH
                03EF    322714      STA BCDDG
                03F2    CD0938      CALL CO
                03F5    CD0338      CALL CI
                03F8    4F          MOV C,A
                03F9    E670        ANI 70H
                03FB    FE30        CPI 30H
                03FD    79          MOV A,C
                03FE    CA0304      JZ NOOK2
                0401    3E0F        MVI A,0FH
                0403                NOOK2:
                0403    E64F        ANI 4FH
                0405    322814      STA BCDDG+1
                0408    CD0938      CALL CO
                040B    3E02        MVI A,2
                040D    112714      LXI D,BCDDG
                0410    CD8F03      CALL BCDBIN
                0413    7D          MOV A,L
```

Console Program/Figure 6

```
                    0414    FE40        CPI 64
                    0416    D2D403      JNC MOLDI
                    0419    5F          MOV E,A
                    041A    1600        MVI D,0
Console             041C    217D15      LXI H,RJSTA
Program/            041F    19          DAD D
Figure 6            0420    C9          RET
                                        ;
                                        ; MOLD SORT STATUS
                                        ;
                    0421                MOLDS:
                    0421    CD9100      CALL CRLNF
                    0424    217935      LXI H,CON2
                    0427    0626        MVI B,38
                    0429    CD3435      CALL STPNT
                    042C    CD9100      CALL CRLNF
                    042F    217D15      LXI H,RJSTA
                    0432    3E00        MVI A,0
                    0434    0600        MVI B,0
                    0436                AGN3:
                    0436    BE          CMP M
                    0437    CA6304      JZ ARD1
                    043A    F5          PUSH PSW
                    043B    E5          PUSH H
                    043C    C5          PUSH B
                    043D    78          MOV A,B
                    043E    322113      STA BINNO
                    0441    3E06        MVI A,6
                    0443    112113      LXI D,BINNO
                    0446    211913      LXI H,HEXBF
                    0449    CD8434      CALL TOASC
                    044C    0E20        MVI C,' '
                    044E    CD0938      CALL CO
                    0451    3600        MVI M,0
                    0453    23          INX H
                    0454    4E          MOV C,M
                    0455    CD0938      CALL CO
                    0458    70          MOV M,0
                    0459    23          INX H
                    045A    4E          MOV C,M
                    045B    3600        MVI M,0
                    045D    CD0938      CALL CO
                    0460    C1          POP B
                    0461    E1          POP H
                    0462    F1          POP PSW
                    0463                ARD1:
                    0463    23          INX H
                    0464    04          INR B
                    0465    78          MOV A,B
                    0466    FE40        CPI 64
                    0468    3E80        MVI A,80H
                    046A    C23604      JNZ AGN3
                    046D    C9          RET
                                        ;
                                        ; SET MOLD REJECT
Console                                 ;
Program/            046E                RJECT:
Figure 6            046E    CDD403      CALL MOLDI
                    0471    3600        MVI M,0
                    0473    CD2104      CALL MOLDS
                    0476    C9          RET
                                        ;
                                        ; CLEAR MOLD REJECT
                                        ;
                    0477                PACK:
                    0477    CDD403      CALL MOLDI
                    047A    3680        MVI M,80H
                    047C    CD2104      CALL MOLDS
                    047F    C9          RET
                                        ;
                                        ; PRINT STATUS OF MOLD SORT
                                        ;
                    0480                STAT:
                    0480    CD2104      CALL MOLDS
                    0483    C9          RET
                                        ;
```

```
                ; DEFINE WORK AREA (RAM)
                ;
     1300           ORG 1300H
                ;
     1300  4D4D2F44  DATE: DB 'MM/DD/YY '
     1304  442F5959
     1308  2020
     130A  DB15     STADR: DW STORE
     130C  0A       BCNT: DB 10
     000A          SMOLD: DS 10
     1317  0D13    MOLDA: DW SMOLD
     1319  20202020 HEXBF: DB '        '
     131D  2020
     131F  0000      DW 0000H
     0001          BINNO: DS 1
     0080          PCTP: DS 128
     0080          PCTR: DS 128
     0002          PNRDP: DS 2
     0002          PNRDR: DS 2
     1426  80      RJSW: DB 80H
     0500          CLCMD EQU 500H
     3803          CI EQU 3803H
     1427  0000    BCDDG: DW 0000H
     3809          CO EQU 3809H
     1429  0000    TOTP: DW 0000H
     142B  0000    TOTR: DW 0000H
     142D  0000    TOTL: DW 0000H
     3812          CSTS EQU 3812H
     142F  39393939 JBNO: DB '9999'
     1433  48484D4D HOUR: DB 'HHMM'
     1437  20
     11C2          TABLE EQU 11C2H
     0004          PTLN: DS 4
     0008          ML1: DS 8
     0010          PK1: DS 16
     0006          RJ1: DS 6
     0022           DS 34
     147C  00      ESW: DB 00H
     0080          CNTP: DS 128
     0080          CNTR: DS 128
     0040          RJSTA: DS 64
     15BD  0000    NORDP: DW 0000H
     15BF  0000    NORDR: DW 0000H
     15C1  00      SW1: DB 00H
     12E6          MOLD EQU 12E6H
     15C2  C211    ADRWK: DW TABLE
     0004          BCDBF: DS 4
     15C8  0000      DW 0000H
     0001          BINCH: DS 1
     15CB  00      COUN1: DB 00H
     1226          IPTCT EQU 1226H
     15CC  0000    MDSRJ: DW 0000H
     15CE  0000    PMDRJ: DW 0000H
     15D0  0000    CKRJ: DW 0000H
     15D2  0000    PCKRJ: DW 0000H
     0002          SBIN: DS 2
     0001           NBIT: DS 1
     0002          SBT: DS 2

0001          NBI: DS 1
     0001          TSW: DS 1
     03E8          STORE: DS 1000
                ;
     3000           ORG 3000H
                ;
                ;
                ; REQUESTED REPORT
                ;
     3000          RPORT:
     3000  017D14    LXI B,CNTP
     3003  112213    LXI D,PCTP
     3006  26FF      MVI H,255
     3008          AGN4:
     3008  0A        LDAX B
     3009  12        STAX D
     300A  AF        XRA A
```

|  | | | |
|---|---|---|---|
| | 300B | 02 | STAX B |
| | 300C | 03 | INX B |
| | 300D | 13 | INX D |
| | 300E | 25 | DCR H |
| | 300F | C20830 | JNZ AGN4 |
| | 3012 | 0A | LDAX B |
| | 3013 | 12 | STAX D |
| Console | 3014 | AF | XRA A |
| Program/ | 3015 | 02 | STAX B |
| Figure 6 | 3016 | 01BD15 | LXI B,NORDP |
| | 3019 | 112214 | LXI D,PNRDP |
| | 301C | 0A | LDAX B |
| | 301D | 12 | STAX D |
| | 301E | AF | XRA A |
| | 301F | 02 | STAX B |
| | 3020 | 03 | INX B |
| | 3021 | 13 | INX D |
| | 3022 | 0A | LDAX B |
| | 3023 | 12 | STAX D |
| | 3024 | AF | XRA A |
| | 3025 | 02 | STAX B |
| | 3026 | 03 | INX B |
| | 3027 | 13 | INX D |
| | 3028 | 0A | LDAX B |
| | 3029 | 12 | STAX D |
| | 302A | AF | XRA A |
| | 302B | 02 | STAX B |
| | 302C | 03 | INX B |
| | 302D | 13 | INX D |
| | 302E | 0A | LDAX B |
| | 302F | 12 | STAX D |
| | 3030 | AF | XRA A |
| | 3031 | 02 | STAX B |
| | 3032 | 2ACC15 | LHLD MDSRJ |
| | 3035 | 22CE15 | SHLD PMDRJ |
| | 3038 | 210000 | LXI H,0 |
| | 303B | 22CC15 | SHLD MDSRJ |
| | 303E | 2AD015 | LHLD CKRJ |
| | 3041 | 22D215 | SHLD PCKRJ |
| | 3044 | 210000 | LXI H,0 |
| | 3047 | 22D015 | SHLD CKRJ |
| | 304A | | HRIN: |
| | 304A | CD9100 | CALL CRLNF |
| | 304D | 21E335 | LXI H,CON4 |
| | 3050 | 061C | MVI B,28 |
| | 3052 | CD3435 | CALL STPNT |
| | 3055 | 213314 | LXI H,HOUR |
| | 3058 | 0604 | MVI B,4 |
| | 305A | | AGN6: |
| | 305A | CD0338 | CALL CI |
| | 305D | 77 | MOV M,A |
| | 305E | 4F | MOV C,A |
| | 305F | CD0938 | CALL CO |
| Console | 3062 | 23 | INX H |
| Program/ | 3063 | 05 | DCR B |
| Figure 6 | 3064 | C25A30 | JNZ AGN6 |
| | 3067 | CD9100 | CALL CRLNF |
| | 306A | 21FF35 | LXI H,CON5 |
| | 306D | 062C | MVI B,44 |
| | 306F | CD3435 | CALL STPNT |
| | 3072 | CD0338 | CALL CI |
| | 3075 | FED9 | CPI 0D9H |
| | 3077 | C24A30 | JNZ HRIN |
| | 307A | 012213 | LXI B,PCTP |
| | 307D | 3E40 | MVI A,64 |
| | 307F | 210000 | LXI H,0 |
| | 3082 | | AGN8: |
| | 3082 | F5 | PUSH PSW |
| | 3083 | 0A | LDAX B |
| | 3084 | 57 | MOV D,A |
| | 3085 | 03 | INX B |
| | 3086 | 0A | LDAX B |
| | 3087 | 5F | MOV E,A |
| | 3088 | 19 | DAD D |
| | 3089 | 03 | INX B |
| | 308A | F1 | POP PSW |
| | 308B | 3D | DCR A |

```
                    308C   C28230    JNZ  AGN8
                    308F   3A2214    LDA  PNRDP
                    3092   57        MOV  D,A
                    3093   3A2314    LDA  PNRDP+1
                    3096   5F        MOV  E,A
                    3097   19        DAD  D
                    3098   222914    SHLD TOTP
                    309B   01A213    LXI  B,PCTR
                    309E   3E40      MVI  A,64
                    30A0   210000    LXI  H,0
                    30A3             AGN9:
                    30A3   F5        PUSH PSW
                    30A4   0A        LDAX B
                    30A5   57        MOV  D,A
                    30A6   03        INX  B
                    30A7   0A        LDAX B
                    30A8   5F        MOV  E,A
                    30A9   19        DAD  D
                    30AA   03        INX  B
                    30AB   F1        POP  PSW
                    30AC   3D        DCR  A
                    30AD   C2A330    JNZ  AGN9
                    30B0   3A2414    LDA  PNRDR
                    30B3   57        MOV  D,A
                    30B4   3A2514    LDA  PNRDR+1
                    30B7   5F        MOV  E,A
                    30B8   19        DAD  D
                    30B9   222B14    SHLD TOTR
                    30BC   EB        XCHG
                    30BD   2A2914    LHLD TOTP
                    30C0   19        DAD  D
                    30C1   222D14    SHLD TOTL
Console             30C4   CD9100    CALL CRLNF
Program/            30C7   0E20      MVI  C,20H
Figure 6            30C9   CD0938    CALL CO
                    30CC   CD0938    CALL CO
                    30CF   210013    LXI  H,DATE
                    30D2   0608      MVI  B,8
                    30D4   0E0A      MVI  C,0AH
                    30D6   CD0938    CALL CO
                    30D9   05        DCR  B
                    30DA   C2D630    JNZ  $-4
                    30DD   0608      MVI  B,8
                    30DF   CD3435    CALL STPNT
                    30E2   0E20      MVI  C,20H
                    30E4   0602      MVI  B,2
                    30E6   CD0938    CALL CO
                    30E9   05        DCR  B
                    30EA   C2E630    JNZ  $-4
                    30ED   215836    LXI  H,RHEAD
                    30F0   0614      MVI  B,20
                    30F2   CD3435    CALL STPNT
                    30F5   213314    LXI  H,HOUR
                    30F8   0604      MVI  B,4
                    30FA   CD3435    CALL STPNT
                    30FD   CD9100    CALL CRLNF
                    3100   0E0A      MVI  C,0AH
                    3102   CD0938    CALL CO
                    3105   CD0938    CALL CO
                    3108   0610      MVI  B,16
                    310A   216C36    LXI  H,HEADA
                    310D   CD3435    CALL STPNT
                    3110   212F14    LXI  H,JBNO
                    3113   0604      MVI  B,4
                    3115   CD3435    CALL STPNT
                    3118   CD9100    CALL CRLNF
                    311B   CD9100    CALL CRLNF
                    311E   0622      MVI  B,34
                    3120   217C36    LXI  H,HEADB
                    3123   CD3435    CALL STPNT
                    3126   CD9100    CALL CRLNF
                    3129   0E0A      MVI  C,0AH
                    312B   CD0938    CALL CO
                    312E   CDAA33    CALL CPTLN
                    3131   212213    LXI  H,PCTP
                    3134   11A213    LXI  D,PCTR
```

|  | 3137 | 0600 | MVI B,0 |
|---|---|---|---|
|  | 3139 |  | AGN13: |
|  | 3139 | CD8B33 | CALL ZEROT |
|  | 313C | 3A7C14 | LDA ESW |
| Console | 313F | 0F | RRC |
| Program/ | 3140 | DACD31 | JC NRP |
| Figure 6 | 3143 | C5 | PUSH B |
|  | 3144 | D5 | PUSH D |
|  | 3145 | E5 | PUSH H |
|  | 3146 | 78 | MOV A,B |
|  | 3147 | 322113 | STA BINNO |
|  | 314A | 3E06 | MVI A,6 |
|  | 314C | 112113 | LXI D,BINNO |
|  | 314F | 211913 | LXI H,HEXBF |
|  | 3152 | CD8434 | CALL TOASC |
|  | 3155 | 3630 | MVI M,30H |
|  | 3157 | 113C14 | LXI D,ML1 |
|  | 315A | 23 | INX H |
|  | 315B | 7E | MOV A,M |
|  | 315C | 12 | STAX D |
|  | 315D | 3630 | MVI M,30H |
|  | 315F | 23 | INX H |
|  | 3160 | 13 | INX D |
|  | 3161 | 7E | MOV A,M |
|  | 3162 | 12 | STAX D |
|  | 3163 | 3630 | MVI M,30H |
|  | 3165 | E1 | POP H |
|  | 3166 | 112013 | LXI D,BINNO-1 |
|  | 3169 | 7E | MOV A,M |
|  | 316A | 12 | STAX D |
|  | 316B | 23 | INX H |
|  | 316C | 13 | INX D |
|  | 316D | 7E | MOV A,M |
|  | 316E | 12 | STAX D |
|  | 316F | 23 | INX H |
|  | 3170 | E5 | PUSH H |
|  | 3171 | 211913 | LXI H,HEXBF |
|  | 3174 | 3E0F | MVI A,15 |
|  | 3176 | CD8434 | CALL TOASC |
|  | 3179 | CDB833 | CALL ZSUPP |
|  | 317C | 114414 | LXI D,PK1 |
|  | 317F | 0606 | MVI B,6 |
|  | 3181 |  | AGN14: |
|  | 3181 | 7E | MOV A,M |
|  | 3182 | 12 | STAX D |
|  | 3183 | 3630 | MVI M,30H |
|  | 3185 | 23 | INX H |
|  | 3186 | 13 | INX D |
|  | 3187 | 05 | DCR B |
|  | 3188 | C28131 | JNZ AGN14 |
|  | 318B | E1 | POP H |
|  | 318C | D1 | POP D |
| Console | 318D | E5 | PUSH H |
| Program/ | 318E | EB | XCHG |
| Figure 6 | 318F | 112013 | LXI D,BINNO-1 |
|  | 3192 | 7E | MOV A,M |
|  | 3193 | 12 | STAX D |
|  | 3194 | 23 | INX H |
|  | 3195 | 13 | INX D |
|  | 3196 | 7E | MOV A,M |
|  | 3197 | 12 | STAX D |
|  | 3198 | 23 | INX H |
|  | 3199 | E5 | PUSH H |
|  | 319A | 211913 | LXI H,HEXBF |
|  | 319D | 3E0F | MVI A,15 |
|  | 319F | CD8434 | CALL TOASC |
|  | 31A2 | CDB833 | CALL ZSUPP |
|  | 31A5 | 115414 | LXI D,RJ1 |
|  | 31A8 | 0606 | MVI B,6 |
|  | 31AA |  | AGN15: |
|  | 31AA | 7E | MOV A,M |
|  | 31AB | 12 | STAX D |
|  | 31AC | 3630 | MVI M,30H |
|  | 31AE | 23 | INX H |
|  | 31AF | 13 | INX D |
|  | 31B0 | 05 | DCR B |
|  | 31B1 | C2AA31 | JNZ AGN15 |

```
                31B4    D1          POP  D
                31B5    E1          POP  H
                31B6    C1          POP  B
                31B7    04          INR  B
                31B8    78          MOV  A,B
                31B9    FE40        CPI  64
                31BB    CACA31      JZ   LOUT
                31BE    C5          PUSH B
                31BF    D5          PUSH D
                31C0    E5          PUSH H
                31C1    CD6733      CALL PNTLN
                31C4    E1          POP  H
                31C5    D1          POP  D
                31C6    C1          POP  B
                31C7    C33931      JMP  AGN13
                                    ;
                                    ; PRINT LAST DETAIL LINE
                                    ;
                31CA                LOUT:
                31CA    CD6733      CALL PNTLN
                31CD                NRP:
                31CD    CD9100      CALL CRLNF
                31D0    113C14      LXI  D,ML1
                31D3    3E37        MVI  A,37H
                31D5    12          STAX D
                31D6    13          INX  D
                31D7    12          STAX D
                31D8    212214      LXI  H,PNRDP
                31DB    112013      LXI  D,BINNO-1
                31DE    7E          MOV  A,M
                31DF    12          STAX D
                31E0    23          INX  H
                31E1    13          INX  D
                31E2    7E          MOV  A,M
                31E3    12          STAX D
                31E4    211913      LXI  H,HEXBF
                31E7    3E0F        MVI  A,15
                31E9    CD8434      CALL TOASC
                31EC    CDB833      CALL ZSUPP
                31EF    114414      LXI  D,PK1
                31F2    0606        MVI  B,6
                31F4                AGN20:
                31F4    7E          MOV  A,M
                31F5    12          STAX D
                31F6    3630        MVI  M,30H
                31F8    23          INX  H
                31F9    13          INX  D
                31FA    05          DCR  B
                31FB    C2F431      JNZ  AGN20
                31FE    212414      LXI  H,PNRDR
                3201    112013      LXI  D,BINNO-1
                3204    7E          MOV  A,M
                3205    12          STAX D
                3206    23          INX  H
                3207    13          INX  D
                3208    7E          MOV  A,M
                3209    12          STAX D
                320A    211913      LXI  H,HEXBF
                320D    3E0F        MVI  A,15
                320F    CD8434      CALL TOASC
                3212    CDB833      CALL ZSUPP
                3215    115414      LXI  D,RJ1
                3218    0606        MVI  B,6
                321A                AGN21:
                321A    7E          MOV  A,M
                321B    12          STAX D
                321C    3630        MVI  M,30H
                321E    23          INX  H
                321F    13          INX  D
                3220    05          DCR  B
                3221    C21A32      JNZ  AGN21
                3224    214037      LXI  H,CON11
                3227    0616        MVI  B,22
                3229                AG77:
                3229    7E          MOV  A,M
                322A    12          STAX D
                322B    23          INX  H
```

Console Program/Figure 6

Console Program/Figure 6

| | | |
|---|---|---|
| 322C | 13 | INX D |
| 322D | 05 | DCR B |
| 322E | C22932 | JNZ AG77 |
| 3231 | 0638 | MVI B,56 |
| 3233 | CD6933 | CALL PNTL1 |
| 3236 | CD9100 | CALL CRLNF |
| 3239 | 2A2D14 | LHLD TOTL |
| 323C | 112013 | LXI D,BINNO-1 |
| 323F | 7C | MOV A,H |
| 3240 | 12 | STAX D |
| 3241 | 7D | MOV A,L |
| 3242 | 13 | INX D |
| 3243 | 12 | STAX D |
| 3244 | 211913 | LXI H,HEXBF |
| 3247 | 3E0F | MVI A,15 |
| 3249 | CD8434 | CALL TOASC |
| 324C | CDB833 | CALL ZSUPP |
| 324F | E5 | PUSH H |
| 3250 | 219E36 | LXI H,CON6 |
| 3253 | 113814 | LXI D,PTLN |
| 3256 | 061C | MVI B,28 |
| 3258 | 7E | MOV A,M |
| 3259 | 12 | STAX D |
| 325A | 23 | INX H |
| 325B | 13 | INX D |
| 325C | 05 | DCR B |
| 325D | C25832 | JNZ S-5 |
| 3260 | E1 | POP H |
| 3261 | 0606 | MVI B,6 |
| 3263 | 7E | MOV A,M |
| 3264 | 12 | STAX D |
| 3265 | 3630 | MVI M,30H |
| 3267 | 23 | INX H |
| 3268 | 13 | INX D |
| 3269 | 05 | DCR B |
| 326A | C26332 | JNZ S-7 |
| 326D | 0622 | MVI B,34 |
| 326F | CD6933 | CALL PNTL1 |
| 3272 | 2A2914 | LHLD TOTP |
| 3275 | 112013 | LXI D,BINNO-1 |
| 3278 | 7C | MOV A,H |
| 3279 | 12 | STAX D |
| 327A | 13 | INX D |
| 327B | 7D | MOV A,L |
| 327C | 12 | STAX D |
| 327D | 211913 | LXI H,HEXBF |
| 3280 | 3E0F | MVI A,15 |
| 3282 | CD8434 | CALL TOASC |
| 3285 | CDB833 | CALL ZSUPP |
| 3288 | E5 | PUSH H |
| 3289 | 21BA36 | LXI H,CON7 |
| 328C | 113814 | LXI D,PTLN |
| 328F | 061C | MVI B,28 |
| 3291 | 7E | MOV A,M |
| 3292 | 12 | STAX D |
| 3293 | 23 | INX H |
| 3294 | 13 | INX D |
| 3295 | 05 | DCR B |
| 3296 | C29132 | JNZ S-5 |
| 3299 | E1 | POP H |
| 329A | 0606 | MVI B,6 |
| 329C | 7E | MOV A,M |
| 329D | 3630 | MVI M,30H |
| 329F | 12 | STAX D |
| 32A0 | 23 | INX H |
| 32A1 | 13 | INX D |
| 32A2 | 05 | DCR B |
| 32A3 | C29C32 | JNZ S-7 |
| 32A6 | 0622 | MVI B,34 |
| 32A8 | CD6933 | CALL PNTL1 |
| 32AB | 2A2B14 | LHLD TOTR |
| 32AE | 112013 | LXI D,BINNO-1 |
| 32B1 | 7C | MOV A,H |
| 32B2 | 12 | STAX D |
| 32B3 | 13 | INX D |
| 32B4 | 7D | MOV A,L |
| 32B5 | 12 | STAX D |

|   |   |   |   |
|---|---|---|---|
|   | 32B6 | 211913 | LXI H,HEXBF |
|   | 32B9 | 3E0F | MVI A,15 |
|   | 32BB | CD8434 | CALL TOASC |
|   | 32BE | CDB833 | CALL ZSUPP |
|   | 32C1 | E5 | PUSH H |
|   | 32C2 | 21D636 | LXI H,CON6 |
|   | 32C5 | 113814 | LXI D,PTLN |
| ----- | 32C8 | 061C | MVI B,28 |
|   | 32CA | 7E | MOV A,M |
|   | 32CB | 12 | STAX D |
|   | 32CC | 23 | INX H |
|   | 32CD | 13 | INX D |
|   | 32CE | 05 | DCR B |
|   | 32CF | C2CA32 | JNZ S-5 |
|   | 32D2 | E1 | POP H |
|   | 32D3 | 0606 | MVI B,6 |
|   | 32D5 | 7E | MOV A,M |
|   | 32D6 | 3630 | MVI M,30H |
|   | 32D8 | 12 | STAX D |
|   | 32D9 | 23 | INX H |
|   | 32DA | 13 | INX D |
|   | 32DB | 05 | DCR B |
|   | 32DC | C2D532 | JNZ S-7 |
|   | 32DF | 0622 | MVI B,34 |
|   | 32E1 | CD6933 | CALL PNTL1 |
| Console | 32E4 | 2ACE15 | LHLD PMDRJ |
| Program/ | 32E7 | 112013 | LXI D,BINNO-1 |
| Figure 6 | 32EA | 7C | MOV A,H |
|   | 32EB | 12 | STAX D |
|   | 32EC | 13 | INX D |
|   | 32ED | 7D | MOV A,L |
|   | 32EE | 12 | STAX D |
|   | 32EF | 211913 | LXI H,HEXBF |
|   | 32F2 | 3E0F | MVI A,15 |
|   | 32F4 | CD8434 | CALL TOASC |
|   | 32F7 | CDB833 | CALL ZSUPP |
|   | 32FA | E5 | PUSH H |
|   | 32FB | 215637 | LXI H,CON12 |
|   | 32FE | 113814 | LXI D,PTLN |
|   | 3301 | 0622 | MVI B,34 |
|   | 3303 | 7E | MOV A,M |
|   | 3304 | 12 | STAX D |
|   | 3305 | 23 | INX H |
|   | 3306 | 13 | INX D |
|   | 3307 | 05 | DCR B |
|   | 3308 | C20333 | JNZ S-5 |
|   | 330B | E1 | POP H |
|   | 330C | 0606 | MVI B,6 |
|   | 330E | 7E | MOV A,M |
|   | 330F | 3630 | MVI M,30H |
|   | 3311 | 12 | STAX D |
|   | 3312 | 23 | INX H |
|   | 3313 | 13 | INX D |
|   | 3314 | 05 | DCR B |
|   | 3315 | C20E33 | JNZ S-7 |
|   | 3318 | 0628 | MVI B,40 |
|   | 331A | CD6933 | CALL PNTL1 |
| ----- | 331D | 2AD215 | LHLD PCKRJ |
|   | 3320 | 112013 | LXI D,BINNO-1 |
|   | 3323 | 7C | MOV A,H |
|   | 3324 | 12 | STAX D |
|   | 3325 | 13 | INX D |
|   | 3326 | 7D | MOV A,L |
|   | 3327 | 12 | STAX D |
|   | 3328 | 211913 | LXI H,HEXBF |
|   | 332B | 3E0F | MVI A,15 |
|   | 332D | CD8434 | CALL TOASC |
|   | 3330 | CDB833 | CALL ZSUPP |
|   | 3333 | E5 | PUSH H |
|   | 3334 | 217837 | LXI H,CON13 |
|   | 3337 | 113814 | LXI D,PTLN |
|   | 333A | 0622 | MVI B,34 |
|   | 333C | 7E | MOV A,M |
|   | 333D | 12 | STAX D |
|   | 333E | 23 | INX H |
|   | 333F | 13 | INX D |

Console Program/Figure 6

```
3340    05          DCR B
3341    C23C33      JNZ S-5
3344    E1          POP H
3345    0606        MVI B,6
3347    7E          MOV A,M
3348    3630        MVI M,30H
334A    12          STAX D
334B    23          INX H
334C    13          INX D
334D    05          DCR B
334E    C24733      JNZ S-7
3351    0628        MVI B,40
3353    CD6933      CALL PNTL1
3356    0E0A        MVI C,0AH
3358    060A        MVI B,10
335A    CD0938      CALL CO
335D    05          DCR B
335E    C25A33      JNZ S-4
3361    3E00        MVI A,0
3363    327C14      STA ESW
3366    C9          RET
                    ;
                    ; LINE PRINT ROUTINE
                    ;
3367                PNTLN:
3367    0622        MVI B,34
3369                PNTL1:
3369    213814      LXI H,PTLN
336C    4E          MOV C,M
336D    3620        MVI M,20H
336F    CD0938      CALL CO
3372    23          INX H
3373    05          DCR B
3374    C26C33      JNZ S-8
3377    CD9100      CALL CRLNF
337A    C9          RET
                    ;
                    ; CHANGE DATE ROUTINE
                    ;
337B                CDATE:
337B    CD6702      CALL ENTR
337E    C9          RET
                    ;
                    ; REQUEST KEY ERROR ROUTINE
                    ;
337F                KERR:
337F    219F35      LXI H,CON3
3382    0625        MVI B,37
3384    CD9100      CALL CRLNF
3387    CD3435      CALL STPNT
338A    C9          RET
                    ;
                    ; TEST COUNTERS FOR ZERO
                    ;
338B                ZEROT:
338B    AF          XRA A
338C    7E          MOV A,M
338D    23          INX H
338E    8E          ADC M
338F    2B          DCX H
3390    C0          RNZ
3391    EB          XCHG
3392    AF          XRA A
3393    7E          MOV A,M
3394    23          INX H
3395    8E          ADC M
3396    2B          DCX H
3397    EB          XCHG
3398    C0          RNZ
3399    23          INX H
339A    23          INX H
339B    13          INX D
339C    13          INX D
339D    04          INR B
339E    78          MOV A,B
339F    FE40        CPI 64
33A1    C28B33      JNZ ZEROT
```

```
                33A4    3E01        MVI A,1
                33A6    327C14      STA ESW
                33A9    C9          RET
                                    ;
                                    ; CLEAR PRINT LINE
                                    ;
                33AA                CPTLN:
                33AA    3E20        MVI A,20H
                33AC    113814      LXI D,PTLN
                33AF    0644        MVI B,68
                33B1    12          STAX D
                33B2    13          INX D
                33B3    05          DCR B
                33B4    C2B133      JNZ S-3
                33B7    C9          RET
                                    ;
                                    ; ZERO SUPPRESS ROUTINE
                                    ;
                33B8                ZSUPP:
                33B8    111913      LXI D,HEXBF
                33BB    0605        MVI B,5
                33BD                ZAGN:
                33BD    1A          LDAX D
                33BE    FE30        CPI 30H
                33C0    C2CB33      JNZ ZEND
                33C3    3E20        MVI A,20H
                33C5    12          STAX D
                33C6    13          INX D
                33C7    05          DCR B
                33C8    C2BD33      JNZ ZAGN
                33CB                ZEND:
Console         33CB    C9          RET
Program/                            ;
Figure 6                            ; SET DIAGNOSTIC PROGRAM
                                    ;
                33CC                RDIAG:
                33CC    3E01        MVI A,1
                33CE    32DA15      STA TSW
                33D1    C9          RET
                                    ;
                                    ; CLEAR DIAGNOSTIC PROGRAM
                                    ;
                33D2                CDIAG:
                33D2    3E00        MVI A,0
                33D4    32DA15      STA TSW
                33D7    C9          RET
                                    ;
                                    ; PRINT DIAGNOSTIC REPORT
                                    ;
                33D8                PRINT:
Interrupt       33D8    21DB15      LXI H,STORE
Output          33DB    220A13      SHLD STADR
Program/        33DE    CD9100      CALL CRLNF
Figure 7G       33E1    3E32        MVI A,50
                33E3    320C13      STA BCNT
                33E6    3E0A        MVI A,10
                33E8    32CB15      STA COUN1
                33EB                PTENT:
                33EB    AF          XRA A
                33EC    7E          MOV A,M
                33ED    23          INX H
                33EE    8E          ADC M
                33EF    CA1B34      JZ CNT0
                33F2    2B          DCX H
                33F3    112113      LXI D,BINNO
                33F6    7E          MOV A,M
                33F7    3600        MVI M,0
                33F9    12          STAX D
                33FA    1B          DCX D
                33FB    23          INX H
                33FC    7E          MOV A,M
                33FD    3600        MVI M,0
                33FF    12          STAX D
                3400    13          INX D
                3401    E5          PUSH H
                3402    211913      LXI H,HEXBF
                3405    3E0F        MVI A,15
```

|  |  |  |  |
|---|---|---|---|
| Interrupt Output Program/ Figure 7G | 3407 | CD8434 | CALL TOASC |
| | 340A | CDB833 | CALL ZSUPP |
| | 340D | 0606 | MVI B,6 |
| | 340F | | WRDPT: |
| | 340F | 4E | MOV C,M |
| | 3410 | 3600 | MVI M,0 |
| | 3412 | CD0938 | CALL CO |
| | 3415 | 23 | INX H |
| | 3416 | 05 | DCR B |
| | 3417 | C20F34 | JNZ WRDPT |
| | 341A | E1 | POP H |
| | 341B | | CNT0: |
| | 341B | 23 | INX H |
| | 341C | 3ACB15 | LDA COUN1 |
| | 341F | 3D | DCR A |
| | 3420 | 32CB15 | STA COUN1 |
| | 3423 | C2EB33 | JNZ PTENT |
| | 3426 | CD9100 | CALL CRLNF |
| | 3429 | CD9100 | CALL CRLNF |
| | 342C | 3E0A | MVI A,10 |
| | 342E | 32CB15 | STA COUN1 |
| | 3431 | 3A0C13 | LDA BCNT |
| | 3434 | 3D | DCR A |
| | 3435 | 320C13 | STA BCNT |
| | 3438 | C2EB33 | JNZ PTENT |
| | 343B | 3E0A | MVI A,10 |
| | 343D | 320C13 | STA BCNT |
| | 3440 | 210D13 | LXI H,SMOLD |
| | 3443 | 221713 | SHLD MOLDA |
| | 3446 | | PTMLD: |
| | 3446 | 7E | MOV A,M |
| | 3447 | E5 | PUSH H |
| | 3448 | 322113 | STA BINNO |
| | 344B | 112113 | LXI D,BINNO |
| | 344E | 211913 | LXI H,HEXBF |
| | 3451 | 3E06 | MVI A,6 |
| | 3453 | CD8434 | CALL TOASC |
| | 3456 | 3E30 | MVI A,30H |
| | 3458 | 77 | MOV M,A |
| | 3459 | 23 | INX H |
| | 345A | 4E | MOV C,M |
| | 345B | 77 | MOV M,A |
| | 345C | CD0938 | CALL CO |
| | 345F | 23 | INX H |
| | 3460 | 4E | MOV C,M |
| Interrupt Output Program/ Figure 7G | 3461 | 77 | MOV M,A |
| | 3462 | CD0938 | CALL CO |
| | 3465 | 0E20 | MVI C,20H |
| | 3467 | CD0938 | CALL CO |
| | 346A | E1 | POP H |
| | 346B | 3600 | MVI M,0 |
| | 346D | 23 | INX H |
| | 346E | 3A0C13 | LDA BCNT |
| | 3471 | 3D | DCR A |
| | 3472 | 320C13 | STA BCNT |
| | 3475 | C24634 | JNZ PTMLD |
| | 3478 | CD9100 | CALL CRLNF |
| | 347B | CD9100 | CALL CRLNF |
| | 347E | 3E0A | MVI A,10 |
| | 3480 | 320C13 | STA BCNT |
| | 3483 | C9 | RET |

```
;*********************
; BINARY TO ASC ROUTINE
;*********************
;
;
```

|  |  |  |  |
|---|---|---|---|
| | 3484 | | TOASC: |
| | 3484 | 32D915 | STA NBI |
| | 3487 | D5 | PUSH D |
| | 3488 | E5 | PUSH H |
| | 3489 | EB | XCHG |
| Console Program/ Figure 6 | 348A | 22D715 | SHLD SBT |

```
;
; TEST IF BINARY VALUE IS ZEROO
;
```

|  |  |  |  |
|---|---|---|---|
| | 348D | AF | XRA A |
| | 348E | 7E | MOV A,M |

```
                    348F    2B          DCX  H
                    3490    8E          ADC  M
                    3491    2B          DCX  H
                    3492    8E          ADC  M
                    3493    CA5E03      JZ   EXIT
                    3496    EB          XCHG
------|----         3497    3AD915      LDA  NBI
                    349A    FE18        CPI  24
                    349C    CAC034      JZ   TEN7A
                    349F    FE12        CPI  18
                    34A1    D2C834      JNC  TEN6A
                    34A4    FE0F        CPI  15
                    34A6    D2D034      JNC  TEN5A
                    34A9    FE0C        CPI  12
                    34AB    D2D834      JNC  TEN4A
                    34AE    FE08        CPI  8
                    34B0    D2E034      JNC  TEN3A
                    34B3    FE06        CPI  6
                    34B5    D2E834      JNC  TEN2A
                    34B8    FE03        CPI  3
                    34BA    D2F034      JNC  TEN1A
                    34BD    C3F834      JMP  TEN0A
                                        ;
                                        ; BEGIN CONVERSION
                                        ;
                    34C0    1698        TEN7A: MVI D,98H
                    34C2    018096      LXI  B,9680H
   Console          34C5    CD0635      CALL DIGT
   Program/         34C8    160F        TEN6A: MVI D,0FH
   Figure 6         34CA    014042      LXI  B,4240H
                    34CD    CD0635      CALL DIGT
                    34D0    1601        TEN5A: MVI D,1
                    34D2    01A086      LXI  B,86A0H
                    34D5    CD0635      CALL DIGT
                    34D8    1600        TEN4A: MVI D,0
                    34DA    011027      LXI  B,10000
                    34DD    CD0635      CALL DIGT
                    34E0    1600        TEN3A: MVI D,0
                    34E2    01E803      LXI  B,1000
                    34E5    CD0635      CALL DIGT
                    34E8    1600        TEN2A: MVI D,0
                    34EA    016400      LXI  B,100
                    34ED    CD0635      CALL DIGT
                    34F0    1600        TEN1A: MVI D,0
                    34F2    010A00      LXI  B,10
                    34F5    CD0635      CALL DIGT
                    34F8    1600        TEN0A: MVI D,0
                    34FA    010100      LXI  B,1
                    34FD    CD0635      CALL DIGT
                    3500    C30335      JMP  EXITA
                    3503                EXITA:
                    3503    E1          POP  H
                    3504    D1          POP  D
                    3505    C9          RET
                                        ;
                                        ; SUBTRACTION ROUTINE
------|----                             ;
                    3506                DIGT:
                    3506    3630        MVI  M,30H
                    3508    E5          PUSH H
                    3509                SUB1A:
                    3509    2AD715      LHLD SBT
                    350C    7E          MOV  A,M
                    350D    91          SUB  C
                    350E    77          MOV  M,A
                    350F    2B          DCX  H
                    3510    7E          MOV  A,M
                    3511    98          SBB  B
                    3512    77          MOV  M,A
                    3513    2B          DCX  H
                    3514    7E          MOV  A,M
                    3515    9A          SBB  D
                    3516    77          MOV  M,A
                    3517    7A          MOV  A,D
                    3518    DA2235      JC   RSTRA
```

Console Program/ Figure 6

```
351B    E1              POP H
351C    34              INR M
351D    E5              PUSH H
351E    57              MOV D,A
351F    C30935          JMP SUB1A
                        ;
                        ; RESTORE ROUTINE
                        ;
3522                    RSTRA:
3522    57              MOV D,A
3523    2AD715          LHLD SBT
3526    7E              MOV A,M
3527    81              ADD C
3528    77              MOV M,A
3529    2B              DCX H
352A    7E              MOV A,M
352B    88              ADC B
352C    77              MOV M,A
352D    2B              DCX H
352E    7E              MOV A,M
352F    8A              ADC D
3530    77              MOV M,A
3531    E1              POP H
3532    23              INX H
3533    C9              RET
                        ;
                        ; STANDARD PRINT ROUTINE
                        ;
3534                    STPNT:
3534    4E              MOV C,M
3535    CD0938          CALL CO
3538    23              INX H
3539    05              DCR B
353A    C23435          JNZ STPNT
353D    C9              RET
                        ;
                        ; DEFINE CONSTANTS (ROM)
                        ;
353E    6E04    BHTAB:  DW RJECT
3540    7704            DW PACK
3542    8004            DW STAT
3544    7B33            DW CDATE
3546    0030            DW RPORT
3548    CC33            DW RDIAG
354A    D233            DW CDIAG
354C    7F33            DW KERR
354E    52      CDTAB:  DB 'R'
354F    50              DB 'P'
3550    53              DB 'S'
3551    44              DB 'D'
3552    41              DB 'A'
3553    54              DB 'T'
3554    43              DB 'C'
3555    5A              DB 'Z'
3556    C211    ADTAB:  DW TABLE
3558    454E5445 CON1:  DB 'ENTER TWO DIGIT MOLD NO. (IE 01) '
355C    52205457
3560    4F204449
3564    47495420
3568    4D4F4C44
356C    204E302E
3570    20284945
3574    20303129
3578    20
3579    4D4F4C44 CON2:  DB 'MOLDS NOW BEING AUTOMATICALLY REJECTED'
357D    53204E4F
3581    57204245
3585    494E4720
3589    4155544F
358D    4D415449
3591    43414C4C
3595    59205245
3599    4A454354
359D    4544
359F    4B455920 CON3:  DB 'KEY ERROR, YOU SCREWED-UP, TRY AGAIN!'
35A3    4552524F
```

Console Program/Figure 6

```
35A7  522C2059
35AB  4F552053
35AF  43524557
35B3  45442D55
35B7  502C2054
35BB  52592041
35BF  4741494E
35C3  21
35C4  454E5445  HEAD1: DB 'ENTER TODAYS DATE (MM/DD/YY) '
35C8  5220544F
35CC  44415953
35D0  20444154
35D4  4520284D
35D8  4D2F4444
35DC  2F595929
35E0  202020        DB '   '
35E3  454E5445  CON4: DB 'ENTER TIME (HHMM) IE 0830     '
35E7  52205449
35EB  4D452028
35EF  48484D4D
35F3  29204945
35F7  20303833
35FB  30202020
35FF  49532054  CON5: DB 'IS TIME CORRECT? IF YES ENTER Y - NO ENTER
3603  494D4520
3607  434F5252
360B  4543543F
360F  20494620
3613  59455320
3617  454E5445
361B  52205920
361F  2D204E4F
3623  20454E54
3627  4552204E
362B  49532044  HEAD3: DB 'IS DATE CORRECT ? IF YES ENTER Y - NO ENTE
362F  41544520
3633  434F5252
3637  45435420
363B  3F204946
363F  20594553
3643  20454E54
3647  45522059
364B  202D204E
364F  4F20454E
3653  54455220
3657  4E
3658  484F5552  RHEAD: DB 'HOURLY REPORT   TIME '
365C  4C592052
3660  45504F52
3664  54202054
3668  494D4520
366C  2020204A  HEADA: DB '   JOB NUMBER - '
3670  4F42204E
3674  554D4245
3678  52202D20
367C            HEADB:
367C  2020204D  DB '   MOLD#      PASSED       REJECTED '
3680  4F4C4423
3684  20202020
3688  50415353
368C  45442020
3690  20202020
3694  20205245
3698  4A454354
369C  4544
369E  20202020  CON6: DB '    TOTAL BOTTLES READ      '
36A2  544F5441
36A6  4C20424F
36AA  54544C45
36AE  53205245
36B2  41442020
36B6  20202020
36BA  20202020  CON7: DB '    TOTAL BOTTLES PACKED    '
36BE  544F5441
36C2  4C20424F
36C6  54544C45
36CA  53205041
```

|  |  |  |  |  |
|---|---|---|---|---|
| | 36CE | 434B4544 | | |
| | 36D2 | 20202020 | | |
| Console | 36D6 | 20202020 | CON8: DB ' | TOTAL BOTTLES REJECTED ' |
| Program/ | 36DA | 544F5441 | | |
| Figure 6 | 36DE | 4C20424F | | |
| | 36E2 | 54544C45 | | |
| | 36E6 | 53205245 | | |
| | 36EA | 4A454354 | | |
| | 36EE | 45442020 | | |
| | 36F2 | 454E5445 | CON10: DB 'ENTER 4 DIGIT JOB NUMBER IE 0001' |
| | 36F6 | 52203420 | | |
| | 36FA | 44494749 | | |
| | 36FE | 54204A4F | | |
| | 3702 | 42204E55 | | |
| | 3706 | 4D424552 | | |
| | 370A | 20494520 | | |
| | 370E | 30303031 | | |
| | 3712 | 4953204A | CON14: DB 'IS JOB NUMBER CORRECT? YES ENTER Y- ' |
| | 3716 | 4F42204E | | |
| | 371A | 554D4245 | | |
| | 371E | 5220434F | | |
| | 3722 | 52524543 | | |
| | 3726 | 543F2059 | | |
| | 372A | 45532045 | | |
| | 372E | 4E544552 | | |
| | 3732 | 20592D20 | | |
| | 3736 | 4E4F2045 | DB 'NO ENTER N' |
| | 373A | 4E544552 | | |
| | 373E | 204E | | |
| | 3740 | 20202837 | CON11: DB ' (77= UNABLE TO READ)' |
| | 3744 | 373D2055 | | |
| | 3748 | 4E41424C | | |
| | 374C | 4520544F | | |
| | 3750 | 20524541 | | |
| | 3754 | 4429 | | |
| | 3756 | 20202020 | CON12: DB ' ** REJECTED FOR MOLD SORT ' |
| | 375A | 2020202A | | |
| | 375E | 2A205245 | | |
| | 3762 | 4A454354 | | |
| Console | 3766 | 45442046 | | |
| Program/ | 376A | 4F52204D | | |
| Figure 6 | 376E | 4F4C4420 | | |
| | 3772 | 534F5254 | | |
| | 3776 | 2020 | | |
| | 3778 | 20202020 | CON13: DB ' ** REJECTED BY CD. DET. ' |
| | 377C | 2020202A | | |
| | 3780 | 2A205245 | | |
| | 3784 | 4A454354 | | |
| | 3788 | 45442042 | | |
| | 378C | 59204344 | | |
| | 3790 | 2E204445 | | |
| | 3794 | 542E2020 | | |
| | 3798 | 2020 | | |
| | | | END | |

NO PROGRAM ERRORS
NO PROGRAM ERRORS

SYMBOL TABLE

* 01

| A | 0007 | ACTON | 00AC | ADRWK | 15C2 | ADTAB | 3556 |
|---|---|---|---|---|---|---|---|
| AG77 | 3229 | AGN13 | 3139 | AGN14 | 3181 | AGN15 | 31AA |
| AGN20 | 31F4 | AGN21 | 321A | AGN3 | 0436 | AGN4 | 3008 |
| AGN6 | 305A | AGN8 | 3082 | AGN9 | 30A3 | AGX2 | 00FB |
| ANORD | 0261 | ARD1 | 0463 | B | 0000 | BCD | 039D |
| BCDBF | 15C4 | BCDBI | 038F | BCDDG | 1427 | BCNT | 130C |
| BHTAB | 353E | BINCH | 15CA | BINNO | 1321 | C | 0001 |
| CDATE | 337B | CDIAG | 33D2 | CDTAB | 354E | CI | 3803 |
| CKADD | 0218 | CKRJ | 15D0 | CLCMD | 0500 | CLKOK | 01B6 |
| CNT0 | 341B | CNTP | 147D | CNTR | 14FD | CO | 3809 |
| COMP | 03C3 | CON1 | 3558 | CON10 | 36F2 | CON11 | 3740 |

SYMBOL TABLE -continued

| | | | | | | | |
|---|---|---|---|---|---|---|---|
| CON12 | 3756 | CON13 | 3778 | CON14 | 3712 | CON2 | 3579 |
| CON3 | 359F | CON4 | 35E3 | CON5 | 35FF | CON6 | 369E |
| CON7 | 36BA | CON8 | 36D6 | COUN1 | 15CB | CPTLN | 33AA |
| CRLNF | 0091 | CSTS | 3812 | D | 0002 | DATE | 1300 |
| DIGIT | 0361 | DIGT | 3506 | E | 0003 | END1 | 0114 |
| ENJOB | 02A3 | ENTR | 0267 | ESW | 147C | EXIT | 035E |
| EXITA | 3503 | GETAD | 03CE | GETOT | 0105 | GTTM | 01C1 |
| GTTM1 | 01C9 | H | 0004 | HEAD1 | 35C4 | HEAD3 | 362B |
| HEADA | 366C | HEADB | 367C | HEXBF | 1319 | HOUR | 1433 |
| HRIN | 304A | INQRY | 03B6 | INTRT | 009C | IPTCT | 1226 |
| JBNO | 142F | JLOP2 | 02B3 | KERR | 337F | L | 0005 |
| LOOP | 0394 | LOOP3 | 0277 | LOOPA | 010B | LOOPB | 0150 |
| LOOPC | 0166 | LOUT | 31CA | M | 0006 | MDSRJ | 15CC |
| ML1 | 143C | MOLD | 12E6 | MOLDA | 1317 | MOLDI | 03D4 |
| MOLDS | 0421 | NBI | 15D9 | NBIT | 15D6 | NOOK1 | 03ED |
| NOOK2 | 0403 | NOOUT | 0071 | NORD1 | 01EE | NORD2 | 0246 |
| NORDP | 15BD | NORDR | 15BF | NRP | 31CD | NT1 | 015E |
| NT2 | 0186 | PACK | 0477 | PCKRJ | 15D2 | PCTP | 1322 |
| PCTR | 13A2 | PK1 | 1444 | PMDRJ | 15CE | PNRDP | 1422 |
| PNRDR | 1424 | PNTL1 | 3369 | PNTLN | 3367 | PRINT | 33D8 |
| PSW | 0006 | PTENT | 33EB | PTLN | 1438 | PTMLD | 3446 |
| RDAG1 | 01A0 | RDAGN | 00CE | RDIAG | 33CC | RDOK | 00D1 |
| RDOK1 | 01A3 | RHEAD | 3658 | RJ1 | 1454 | RJECT | 046E |
| RJOFF | 0226 | RJON | 022C | RJSTA | 157D | RJSW | 1426 |
| RPORT | 3000 | RSTR | 037D | RSTRA | 3522 | SBIN | 15D4 |
| SBT | 15D7 | SETZO | 0024 | SMOLD | 130D | SP | 0006 |
| STADR | 130A | STAMP | 0192 | START | 001B | STAT | 0480 |
| STATS | 01D2 | STORE | 15DB | STPNT | 3534 | SUB1 | 0364 |
| SUB1A | 3509 | SW1 | 15C1 | SWON | 00E7 | TABLE | 11C2 |
| TEN0 | 0353 | TEN0A | 34F8 | TEN1 | 034B | TEN1A | 34F0 |
| TEN2 | 0343 | TEN2A | 34E8 | TEN3 | 033B | TEN3A | 34E0 |
| TEN4 | 0333 | TEN4A | 34D8 | TEN5 | 032B | TEN5A | 34D0 |
| TEN6 | 0323 | TEN6A | 34C8 | TEN7 | 031B | TEN7A | 34C0 |
| TEST | 0067 | TOASC | 3484 | TOBCD | 02DF | TOTL | 142D |
| TOTP | 1429 | TOTR | 142B | TSW | 15DA | WRDPT | 340F |
| ZAGN | 33BD | ZEND | 33CB | ZEROT | 338B | ZSUPP | 33B8 |

Interrupt Computation Program/Figures 7C-7F

```
FILEOUT     08:26EDT    08/06/75

8080 PLM1 VERS 2.0

00001  1    1280: /* MOLD NUMBER CLCULATION ROUTINE */;

00002  1       /* THIS IS START OF TIME TABLE */;

00003  1    DECLARE X(50) ADDRESS;

00004  1       /* NUMBER OF BAR COUNTER LOCATION */;

00005  1    DECLARE (BC,MI) BYTE;

00006  1       /* THIS IS STORAGE FOR MOLD NUMBER */;

00007  1    DECLARE SM(10) BYTE;

00008  1    DECLARE D (2) ADDRESS;

00009  1    DECLARE (P,C,S) (25) ADDRESS;

00010  1    DECLARE (W1,W2,Y1,PN,PW,X4,X3,PA) ADDRESS;

00011  1    DECLARE (C3,C1,SLP) ADDRESS;

00012  1    DECLARE (N,I,J,K,MOLD,M,G1,M3,J1,M1,K1,K3) BYTE;

00013  1    DECLARE (START,AW) ADDRESS;
```

```
00014  1    DECLARE SP ADDRESS;
00015  1    DECLARE (K4,K5,K7,I3,I5,K8) BYTE;
00016  1    DECLARE (K9,J2,J3,I6,I7) BYTE;
00017  1    DECLARE BX BYTE;
00018  1    DECLARE CON DATA (42,66,92,117,142,167);
00019  1             BC = 2 * BC;
00020  1             START=(X(BC+1) + 4 * X(0)) /5;
00021  1             SP = ((X(BC+1)-X(0)) * 2) / 100;
00022  1             BX = BC - 2;
00023  1             DO I = 1 TO BC BY 2;
00024  1             IF X(I) < START THEN GO TO L26;
00025  2             J = I + 1;
00026  2             IF X(J)-X(I) > 2 THEN GO TO L24;
00027  2             S(K) = S(K) + (X(J+1)-X(J));
00028  2             GO TO L26;
00029  2    L24: K = K + 1;
00030  2             S(K) = X(J+1) - X(J);
00031  2             P(K) = X(J) - X(I);
00032  2             C(K) = (X(J) + X(I)) / 2;
00033  2             IF I >= BX THEN GO TO L26;
00034  2    L25: IF P(K) < PN THEN PN = P(K);
00035  2    L26: END;
00036  1             BX = 1;
00037  1             PA = 3 * PN;
00038  1             DO I=1 TO K;
00039  1             IF P(I) > PA THEN GO TO L30;
00040  2             WI = WI + P(I);
00041  2             GI = GI + 1;
00042  2    L30: END;
00043  1             AW = (((10*WI)/GI)+5)/10;
00044  1             PA = 15 * AW / 10;
00045  1             K3 = K-1;
00046  1             DO M1 = 1 TO K3;
00047  1             M = K+1 - M1;
00048  2             IF SP < S(M-1) THEN GO TO L38;
00049  2             IF N = 1 THEN GO TO L40;
00050  2             D(N) = (C(M) + C(M-1)) / 2;
00051  2             N = N + 1;
00052  2             K7 = M;
```

```
00053  2          K1 = M-1;
00054  2      L38: END;
00055  1          IF N = 1 THEN GO TO L39F;
00056  1  /* SEEK WIDE BARS IN ABSENCE OF DBL BARS */
00057  1          DO I3=1 TO K3+1;
00058  1          M3 = K+1 - I3;
00059  2          IF P(M3) <= PA THEN GO TO L39;
00060  2          IF I5 = 1 THEN GO TO L39A;
00061  2          D(I5) = C(M3);
00062  2          I5 = I5 + 1;
00063  2          K1 = M3;
00064  2          K8 = M3;
00065  2      L39: END;
00066  1          IF I5 = 1 THEN GO TO L39B;
00067  1          MOLD = 77;
00068  1          GO TO L80;
00069  1      L39A: D(I5) = C(M3);
00070  1          BX = 0;
00071  1          M = M3;
00072  1          GO TO L43;
00073  1      L39B: X4 = 17000 / SLP;
00074  1          X3 = 16000 / SLP;
00075  1          C3 = C(K) - X4;
00076  1          C1 = C(K) - D(0);
00077  1          IF C1 >= X4 THEN GO TO L39D;
00078  1          K9 = K8 -1;
00079  1          DO I=1 TO K9;
00080  1          IF C(I) < C3 THEN GO TO L39C;
00081  2          J2 = J2 + 1;
00082  2          J3 = J2 + K;
00083  2          C(J3) = C(I) + X3;
00084  2      L39C: END;
00085  1      L39D: D(I) = D(0);
00086  1          M = K8 + 1;
00087  1          IF J2 >= 1 THEN GO TO L39E;
00088  1          K1 = M;
00089  1          DO I = M TO K;
00090  1          IF C(I) < D(0)+X4 THEN K1 = K1+1;
00091  2          END;
```

```
00092  1           K = K1;
00093  1           GO TO L43A;
00094  1     L39E: K = J3 + 1;
00095  1           GO TO L43A;
00096  1     L39F: DO I6=1 TO K1;
00097  1           I7 = K1+1 - I6;
00098  2           IF P(I7) <= PA THEN GO TO L39G;
00099  2           IF 16000/SLP > D(0) - C(I7) THEN GO TO L39G;
00100  2           D(1) = C(I7);
00101  2           M = I7;
00102  2           BX = 0;
00103  2           GO TO L43;
00104  2     L39G: END;
00105  1           M = K1 + 2;
00106  1           DO I6=M TO K;
00107  1           IF P(I6) <= PA THEN GO TO L39H;
00108  2           IF 16000/SLP > C(I6) - D(0) THEN GO TO L39H;
00109  2           D(1) = D(0);
00110  2           D(0) = C(I6);
00111  2           K1 = I6;
00112  2           M = M - 1;
00113  2           BX = 0;
00114  2           GO TO L43;
00115  2     L39H: END;
00116  1           C(K7-1) = D(0);
00117  1           K = K - 1;
00118  1           DO I=K7 TO K;
00119  1           C(I) = C(I+1);
00120  2           END;
00121  1           K8 = K7 - 1;
00122  1           GOTO L39B;
00123  1     L40:  D(N) = (C(M) + C(M-1)) / 2;
00124  1           BX = 0;
00125  1     L43:  SLP = 18000 / (D(0) - D(1)) + 1;
00126  1           M = M + 1;
00127  1           K = K1;
00128  1     L43A: I = 0;
00129  1           K7 = 1;
00130  1           DO WHILE M < K;
```

```
00131  1            YI = (SLP*(C(M)-D(1)))/100;
00132  2       L44: IF YI > CON(I) THEN GO TO L45;
00133  2            MOLD = MOLD + K7;
00134  2            K7 = K7*2;
00135  2            I = I+1;
00136  2            GO TO L48;
00137  2       L45: K7 = K7*2;
00138  2            I = I+1;
00139  2            IF I = 6 THEN GO TO L48;
00140  2            GO TO L44;
00141  2       L48: END;
00142  1       L80: IF MOLD = 0 THEN MOLD = 77;
00143  1            VI = 0;
00144  1            N,K,G1,I5,J2 = 0;
00145  1            OUTPUT(1) = BX;
00146  1            HALT;
00147  1  EOF
```

The present invention may be embodied in other specific forms without departing from the spirit or essential attributes thereof and, accordingly, reference should be made to the appended claims, rather than to the foregoing specification as indicating the scope of the invention.

We claim:

1. A computer controlled system for identifying the mold source of a bottle provided with one or more sectors spanning a circumferential zone with prism-like timing marks thereon including a laser source for passing a laser beam through the sectors and a sensor for generating a series of digital pulses in response thereto, comprising:
    means for generating a series of digital clock pulses independently of said sensor pulses;
    means for time stamping said sensor pulses with said clock pulses and for storing the time stamp information;
    means for digitally computing the pulses widths and inter-pulse spacings of said sensor pulses in terms of said time stamp information.
    means for digitally comparing the spans of said sectors in terms of said time stamp information to said interpulse spacings of said sensor pulses; and
    means for digitally weighting the sensor pulses in response to said digitally comparing means to provide a digital signal representing the distribution of said timing marks on said bottle, said distribution of timing marks uniquely identifying the mold source of said bottle.

2. Apparatus according to claim 1 including:
    means for storing said computed digital number;
    means for storing one or more predetermined digital numbers; and
    means for digitally comparing said computed digital number to said predetermined digital numbers and determining whether said computed and predetermined numbers match.

3. Apparatus according to claim 2 including means for generating a status indicating that said bottle is defective independently of said means for digitally comparing said computed and predetermined numbers.

4. Apparatus according to claim 3 including first means for digitally counting the number of instances in which said computed and predetermined numbers match, second means for digitally counting the number of instances in which said computed and predetermined numbers do not match, and third means for digitally counting the number of instances in which said status is generated.

5. Apparatus according to claim 4 including means for storing each of said digital counts and means for printing out said digital counts for each computed digital number.

6. A method for identifying the mold source of a bottle provided with one or more sectors spanning a circumferential zone with prisms-like timing marks thereon including passing a laser beam through the sectors and generating a series of digital sensor pulses in response thereto, comprising the steps of:
    generating a series of digital clock pulses independently of said sensor pulses;
    digitally time stamping said sensor pulses with said clock pulses and storing the time stamp information;
    digitally computing the pulse widths and interpulse spacings of the sensor pulses in terms of the clock pulses;
    digitally comparing the spans of said sectors in terms of said clock pulses to the inter-pulse spacings of said sensor pulses; and digitally weighting the sensor pulses in response to said digitally comparing step to provide a digital signal representing the distribution of said timing marks on said bottle, said distribution of timing marks uniquely identifying the mold source of said bottle.

7. A method according to claim 6 including the steps of:

storing said computed digital number;

storing one or more predetermined digital numbers;

digitally comparing said computed digital number to said predetermined digital numbers; and digitally determining whether said predetermined and computed digital numbers match.

8. The method according to claim 7 including generating a status signal indicating that said bottle is defective independently of said digitally comparing step,.

9. The method according to claim 8 including digitally counting the number of instances in which said computed and predetermined number match, the number of instances in which said computed and predetermined numbers do not match, and the number of instances in which status signal is generated.

10. The method according to claim 9 including storing each of said counts and printing out said counts for each computed digital number.

* * * * *